United States Patent
Fujita et al.

[11] Patent Number: 6,055,361
[45] Date of Patent: *Apr. 25, 2000

[54] PRINTER CONTROL WITH MONITOR FUNCTION

[75] Inventors: Takayuki Fujita, Inagi; Kazunari Shishido, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,810

[22] Filed: Jun. 19, 1996

[30] Foreign Application Priority Data

Jun. 22, 1995 [JP] Japan ................................ 7-156136
Jun. 22, 1995 [JP] Japan ................................ 7-156137

[51] Int. Cl.[7] .................................................. G06F 15/00
[52] U.S. Cl. .......................... 395/114; 395/112; 395/113
[58] Field of Search ................................ 395/114, 113, 395/112, 101, 326, 336, 340, 347, 348, 355, 115, 116; 358/407, 468, 437; 345/326, 336, 340, 347, 348, 355

[56] References Cited

FOREIGN PATENT DOCUMENTS 0573983 12/1993 European Pat. Off. .
0575168 12/1993 European Pat. Off. .
WO94/11804 5/1994 WIPO .

OTHER PUBLICATIONS

Official Action dated Mar. 24, 1999, from the Korean Patent Office in Korean Patent Application No. 10–1996–0022759.

*Primary Examiner*—Dov Popovici
*Attorney, Agent, or Firm*—Fitzpatrick, Cella, Harper & Scinto

[57] ABSTRACT

A printer includes a receiver for receiving a first command and a second command from an external apparatus, and an execution device for executing the first command when the receiver receives the first command, and for executing the second command in preference to the first command when the receiver receives the first command and then receives the second command.

25 Claims, 24 Drawing Sheets

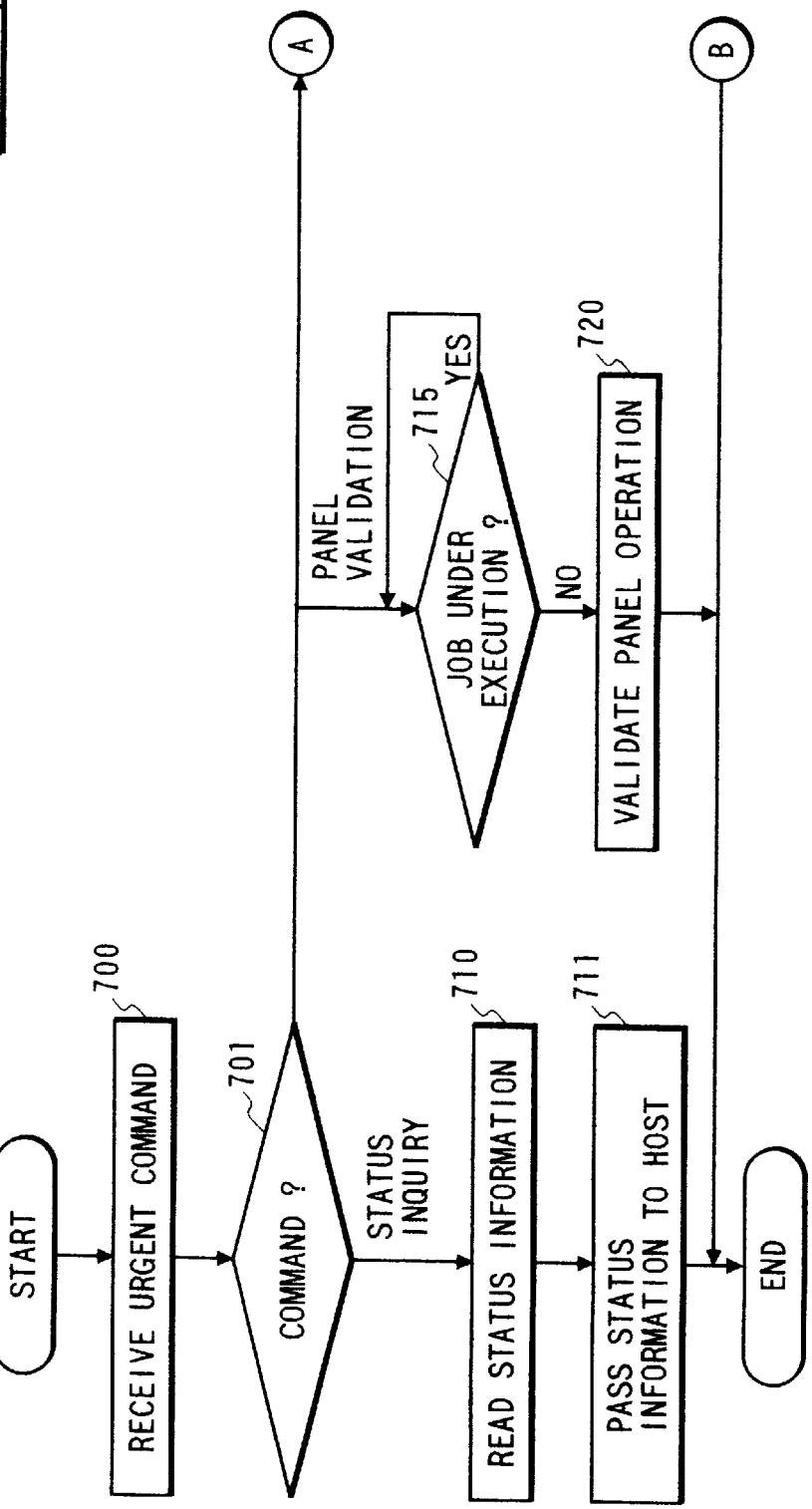

FIG. 8

STATUS INQUIRY COMMAND

| COMMAND CODE | DESCRIPTION |
|---|---|
| 01 | REQUEST FOR 1ST OPERATION STATUS |
| 02 | REQUEST FOR 2ND OPERATION STATUS |
| 03 | REQUEST FOR UNRECOVERABLE ERROR INFORMATION |
| 04 | REQUEST FOR USER ERROR INFORMATION |
| 05 | REQUEST FOR INK ERROR INFORMATION |
| 06 | REQUEST FOR ALARM INFORMATION |
| 07 | REQUEST FOR INPUT BUFFER FREE BLOCK SIZE |

FIG. 9

URGENT EXECUTION COMMAND

| COMMAND CODE | DESCRIPTION |
|---|---|
| 11 | HALT TEMPORARILY ; IMMEDIATELY HALT PRINTER COMMAND EXECUTION |
| 12 | RESUME ; RESUME PRINTER COMMAND EXECUTION |
| 13 | RELEASE ERROR ; RELEASE ERROR STATUS |
| 14 | TERMINATE JOB FORCEDLY ; DELIVER SHEET AND CLEAR INPUT BUFFER FORCEDLY |
| 15 | INVALIDATE PANEL OPERATION |
| 16 | VALIDATE PANEL OPERATION |
| 17 | HEAD CLEANING |
| 18 | CAPPING ; RETREAT HEAD TO HOME POSITION |

FIG. 10

BIT STRUCTURE OF 1ST OPERATION STATUS

| BIT | DESCRIPTION |
|---|---|
| BIT7 | HALTED DUE TO ERROR→REFER TO ERROR INFORMATION |
| BIT6 | ALARM INFORMATION PRESENT→REFER TO ALARM INFORMATION |
| BIT5 | SYSTEM BUSY→REFER TO 2ND OPERATION STATUS |
| BIT4 | 1 = OPERATION PANEL VALID ; 0 = OPERATION PANEL INVALID |
| BIT3 | 1 = SHEET FED |
| BIT2 | PAGE NO. UNDER PRINTING (000—111) |
| BIT1 | |
| BIT0 | |

FIG. 11

BIT STRUCTURE OF 2ND OPERATION STATUS

| BIT | DESCRIPTION |
|---|---|
| BIT7 | UNDER HEAD CLEANING |
| BIT6 | UNDER WARMING UP |
| BIT5 | UNDER URGENT COMMAND PROCESSING |
| BIT4 | UNDER TEMPORARY HALTING |
| BIT3 | SPECIAL MODE (E.G., SERVICE MODE) |
| BIT2 | =0 (RESERVED) |
| BIT1 | =0 (RESERVED) |
| BIT0 | =0 (RESERVED) |

FIG. 12

LIST OF UNRECOVERABLE ERROR INFORMATION

| BIT7 | 1 = (UNRECOVERABLE ERROR PRESENT) |
|---|---|
| BIT6—0 | ERROR CODE (DECIMAL)<br>10 : HEAD CARRIAGE ERROR<br>11 : HOME POSITION SENSOR ERROR<br>12 : SHEET FEEDER MOTOR ERROR<br>13 : AUTO FEEDER ERROR<br>14 : PRINTER ABNORMAL HIGH TEMPERATURE<br>15 : EXHAUST INK TANK FULL<br>16 : EEPROM ERROR<br>17 : PRINT HEAD ERROR<br>18 : INK CARTRIDGE SENSOR ERROR |

FIG. 13

LIST OF USER ERROR INFORMATION

| BIT | DESCRIPTION |
|---|---|
| BIT7 | NO SHEET |
| BIT6 | JAMMING |
| BIT5 | EXHAUST INK TANK ALMOST FULL |
| BIT4 | NO HEAD |
| BIT3 | INK ERROR→REFER TO INK ERROR INFORMATION |
| BIT2 | = 0 (RESERVED) |
| BIT1 | = 0 (RESERVED) |
| BIT0 | = 0 (RESERVED) |

FIG. 14

LIST OF INK ERROR INFORMATION

| BIT | DESCRIPTION | |
|---|---|---|
| BIT7, 6 | INK ERROR, BLACK | BITX, X = 00 : NORMAL |
| BIT5, 4 | INK ERROR, CYAN | 01 : NO INK CARTRIDGE |
| BIT3, 2 | INK ERROR, MAGENTA | 10 : INK LOW |
| BIT1, 0 | INK ERROR, YELLOW | 11 : NO INK |

FIG. 15

LIST OF ALARM INFORMATION

| BIT | DESCRIPTION | |
|---|---|---|
| BIT7 | PRINT DATA OVERRUN SHEET (VERTICAL) | |
| BIT6 | PRINT DATA OVERRUN SHEET (HORIZONTAL) | |
| BIT5 | = 0 (RESERVED) | |
| BIT4 | = 0 (RESERVED) | |
| BIT3 | INK LOW (BLACK) | REMAINS UNSOLVED AFTER INK LOW ERROR IS INFORMED |
| BIT2 | INK LOW (CYAN) | |
| BIT1 | INK LOW (MAGENTA) | |
| BIT0 | INK LOW (YELLOW) | |

FIG. 16

BUFFER FREE BLOCK SIZE

| FREE BLOCK IN BYTES | | |
|---|---|---|
| BIT7—5 (3 BITS) | N(0—7) | FREE BLOCK SIZE = M * (4—N) BYTES |
| BIT4—0 (5 BITS) | M(0—31) | |

PRINTER CONTROL WITH MONITOR FUNCTION

BACKGROUND OF THE INVENTION

1. Field of the Invention

The invention relates to printer control apparatus and method which can monitor a status of a printer which receives data from a host computer or a word processor and prints.

2. Related Background Art

Hitherto, when a document from a host computer is being printed by a printer, the operation to temporarily halt the printing in the halfway or to resume the printing after an error was eliminated is executed by a panel operation on the printer side. Particularly, in the printer of the ink jet type, a cleaning of a print head is instructed by the panel operation during the printing operation. However, since the operator always works for a host computer, it is inconvenient to operate the operation panel of the printer.

In the case where the printer causes an abnormality or generate alarm information, such information is displayed by an LED or LCD display attached to the same operation panel. However, since the operator always works for the host computer, it is inconvenient to pay attention to the display on the operation panel of the printer.

In the case where a printer command including print data is sent from the host computer to the printer and is printed, the printer first receives the reception data into an input buffer and sequentially extracts the data and processes. Upon processing, further, the data is developed to an image into a drawing memory or a printing buffer and, after that, the printing is started. When those processes are seen from the host computer side, after the print data was sent, the data is printed with the elapse of a certain time. Such a time cannot be known by the host computer. Therefore, according to the conventional technique, which page the printer is printing now cannot be known from the host computer side.

In recent years, there are many systems such that in case of printing from the host computer, even if the printer is printing, in order to enable the work of the next computer to be executed, the transmission of the print data is executed by a spooler program. In such a system, when the print data is sent to the printer, the total number of print pages has already been known. Therefore, if the apparatus has means for knowing which page the printer is at present printing, the host computer can notify the operator of information indicative of the number of residual print pages. The operator can judge a remaining time which will be required to finish the printing operation, a necessity to supplement the sheets, or the like.

In the case where the printing is interrupted during the printing due to some causes such as sheet jamming of the printer or the like, the operator also cannot know which page is being printed, so that the host computer cannot judge from which page the printing should be resumed. Therefore, so far, there is an inconvenience such that the operator has to execute new jobs such that a print job in which a jam occurred is once finished and the number of jammed page is counted and the pages after the jammed page are printed.

SUMMARY OF THE INVENTION

To solve the inconvenience in the above conventional technique, it is an object of the invention to provide printer control apparatus and method which enables a display and an operation which have been performed by an operation panel hitherto to be also executed on a host computer side.

Another object of the invention is to provide a cheap printer by executing a display and an operation by a host computer side and by eliminating a panel on a printer side.

The invention is made in consideration of the above drawbacks and it is an object of the invention to provide a construction such that a host computer inquires which page a printer is printing at present, and in response to such an inquiry, the printer returns the page number during the printing, thereby enabling the host computer to always know the page under printing.

It is, therefore, an object of the invention to provide a printing system which can notify the operator of the page number in the whole document which is being printed at present by the printer.

Another object of the invention is to provide a printing system in which in the case where a printer stops during the printing due to an error, a host computer automatically knows a page in which an abnormality occurred, and the printer can again automatically print from the head of such a page.

To accomplish the above objects, according to the invention, there is provided a printer control apparatus comprising: means for connecting a host computer and a printer by a first interface and receiving a first control command group including print data from the host computer through the first interface; and means for connecting the host computer and the printer by a second interface, receiving a second control command group from the host computer through the second interface, distinguishing the second control command group from the first control command group, and preferentially executing the second control command group.

To accomplish the above objects, according to the invention, there is provided a printer control apparatus in which a host computer and a printer are connected by an interface which can bidirectionally exchange information and a command is received from the host computer through the interface and the information is returned to the host computer, wherein the apparatus comprises: means for receiving a command to inquire an operating status of the printer from the host computer; means for returning inquiry information to the host computer in response to the inquiry command; and means for receiving a command to set an operating mode of the printer from the host computer.

To accomplish the above object, according to the invention, there is provided a printer control method comprising the steps of: connecting a host computer and a printer by a first interface and receiving a first control command group including print data from the host computer through the first interface; and connecting the host computer and the printer by a second interface, receiving a second control command group from the host computer through the interface, distinguishing the second control command group from the first control command group, and preferentially executing the second control command group.

To accomplish the above objects, according to the invention, there is provided a printer control method in a printer control apparatus in which a host computer and a printer are connected by an interface which can bidirectionally exchange information and a command is received from the host computer through the interface and the information is returned to the host computer, wherein the printer control method comprises the steps of: receiving a command to inquire an operating status of the printer from the host computer; returning an inquiry information to the host computer in response to the inquiry command; and receiving a command to set an operating mode of the printer from the host computer.

According to the invention with the above construction, since the command corresponding to the control executed by the operation panel hitherto can be preferentially received by the printer from the host computer, a display and an operation which have conventionally been performed by the operation panel of the printer can be also executed on the host computer side.

The display and operation are executed on the host computer side and the panel on the printer side is omitted, so that a cheap printer can be provided.

To accomplish the above object, according to the invention, there is provided a printer control apparatus for controlling a printer which is connected to a host computer by an interface which can bidirectionally exchange information and receives print data from the host computer and prints the print data, wherein the apparatus comprises: means for receiving an ID code to specify a page to be printed from the host computer in correspondence to the print page; means for storing a page ID code of the page under printing; and means for returning the page ID code of the page under printing in response to an inquiry request from the host computer.

To accomplish the above objects, according to the invention, there is provided a printer control apparatus for controlling a printer which is connected to a host computer by an interface which can bidirectionally exchange information and receives print data from the host computer and prints the print data, wherein the apparatus comprises: means for recognizing a start of the printing of a document by a command which is received from the host computer; means for recognizing a delimiter of a page by a command which is received from the host computer; means for making a number correspond to the divided page; means for storing the page number which was made correspond to each page during processing and its processing status; and means for returning the page number and processing status of each page under processing in response to an inquiry request from the host computer.

To accomplish the above objects, according to the invention, there is provided a printer control method of controlling a printer which is connected to a host computer by an interface which can bidirectionally exchange information and receives print data from the host computer and prints the print data, wherein the print control method comprises the steps of: receiving an ID code to specify a page to be printed from the host computer in correspondence to the print page; storing the page ID code of the page under printing; and returning the page ID code under printing in response to an inquiry request from the host computer.

To accomplish the above objects, according to the invention, there is provided a printer control method of controlling a printer which is connected to a host computer by an interface which can bidirectionally exchange information and receives print data from the host computer and prints the print data, comprising the steps of: recognizing a start of the printing of a document by a command which is received from the host computer; recognizing a delimiter of the page by a command which is received from the host computer; making a number correspond to the divided page; storing the page number which was made correspond to each page under processing and its processing status; and returning the page number and processing status of each page under processing in response to an inquiry request from the host computer.

With the above construction, the host computer inquires which page the printer is printing at present and the printer returns the page number under printing in response to the inquiry, so that the host computer can always know the page under printing.

Therefore, which page in the whole document the printer is printing at present can be notified to the operator.

When the printer stops during the printing due to an error, the host computer automatically knows the page in which the abnormality occurred, and the printing can be again automatically executed from the head of such a page.

BRIEF DESCRIPTION OF THE DRAWINGS

FIG. 8 is a diagram showing a list of status information inquiry commands;

FIG. 9 is a diagram showing a list of urgent executing command;

FIG. 10 is a diagram showing a bit construction of a first operation status;

FIG. 11 is a diagram showing a bit construction of a second operation status;

FIG. 12 is a diagram showing a list of unrecoverable error information;

FIG. 13 is a diagram showing a list of user correspondence error information;

FIG. 14 is a diagram showing a list of ink error information;

FIG. 15 is a diagram showing a list of alarm information;

FIG. 16 is a diagram showing an input buffer free block size;

DETAILED DESCRIPTION OF THE PREFERRED EMBODIMENTS

First Embodiment

Figure 1:
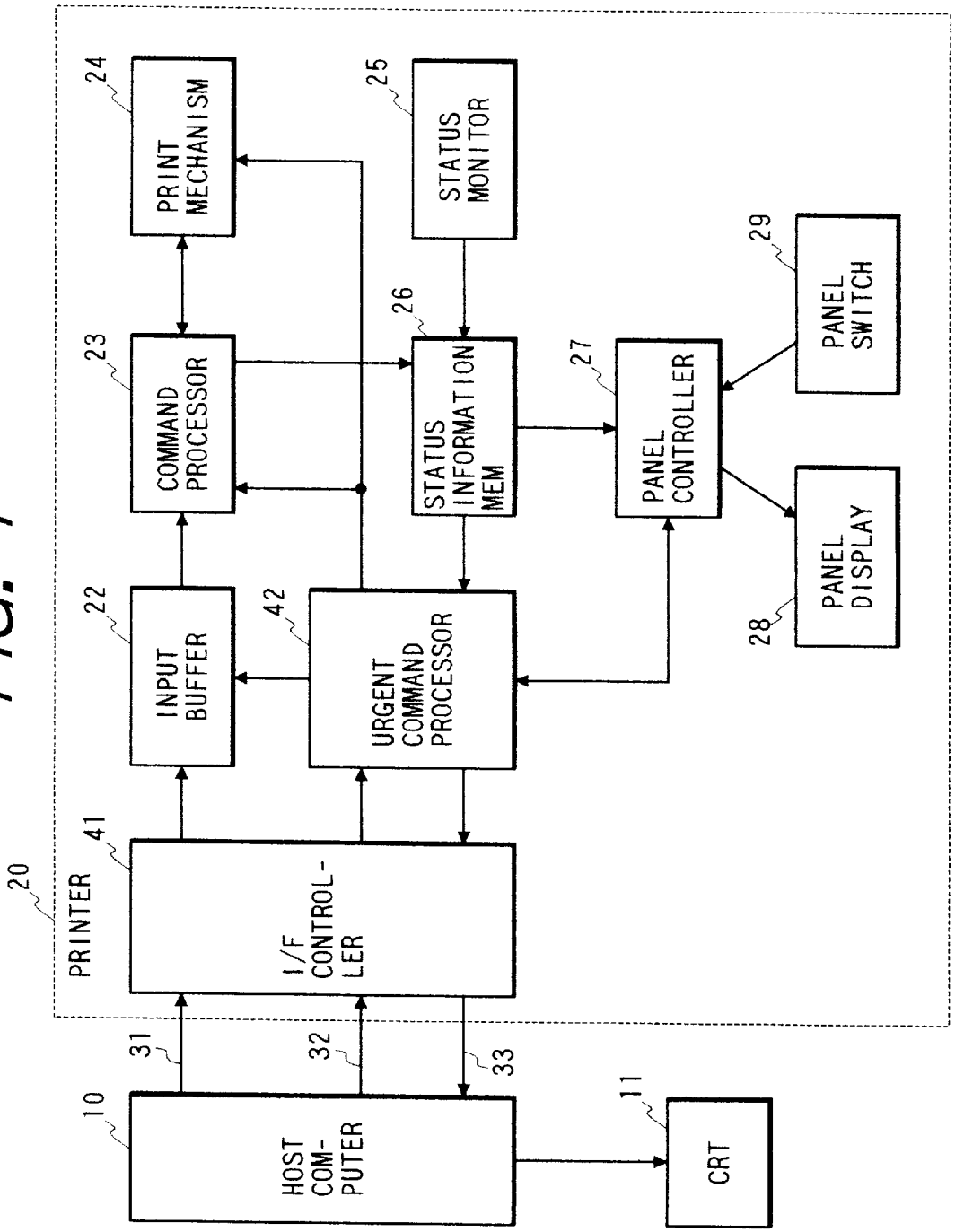
FIG. 1 is a whole constructional diagram of the invention.

FIG. 1 shows an example of a construction of a system according to the invention.

Figure 2:
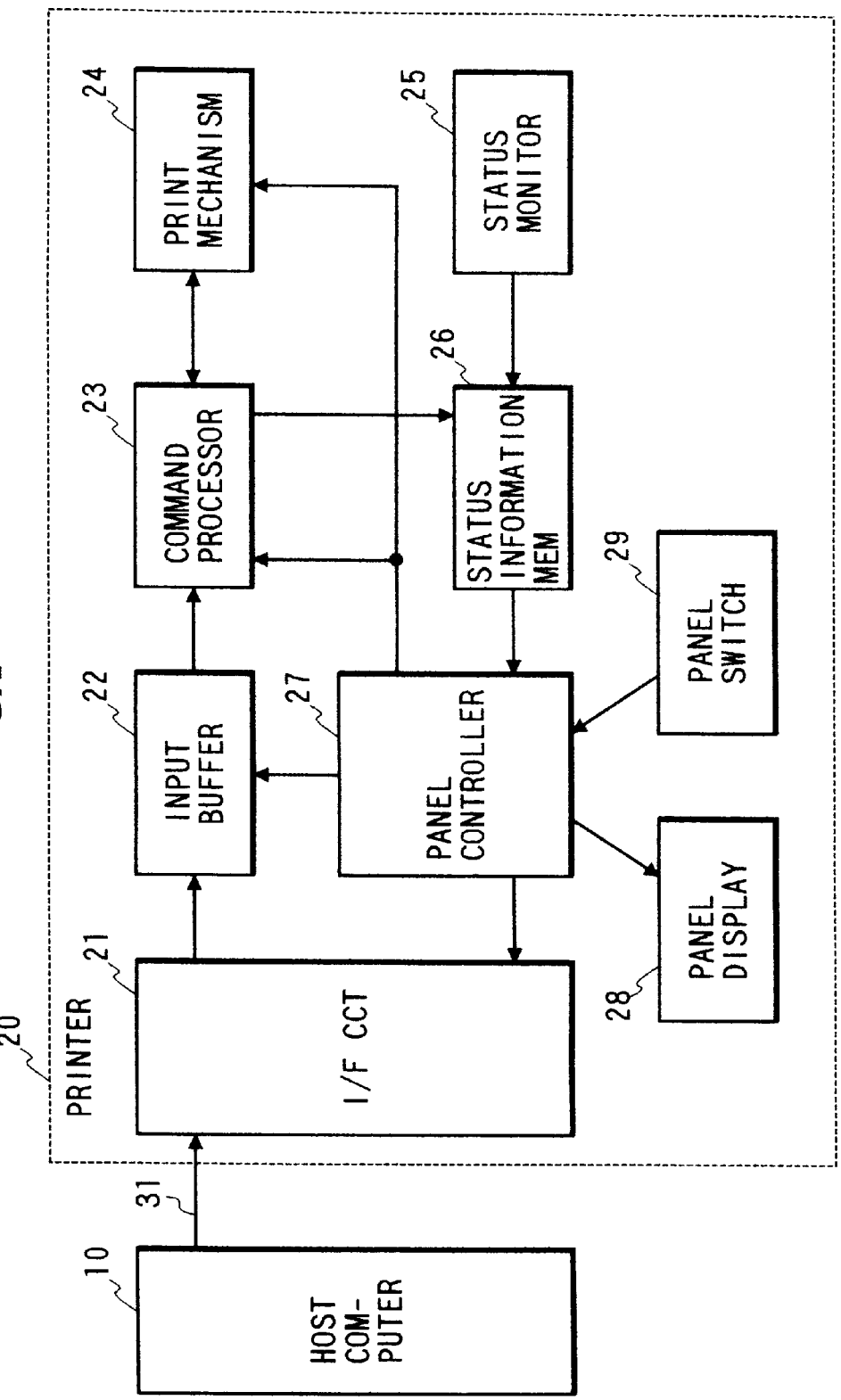
FIG. 2 is a constructional diagram of of a conventional printer.

FIG. 2 shows an example of a construction of a system in a conventional printer corresponding to the system of FIG. 1. In FIG. 2, reference numeral 10 denotes a host computer; 20 a printer; and 31 an interface for connecting the host computer and the printer. In the printer, reference numeral 21 denotes an interface circuit to connect to the host computer. Commands and data which are sent through the interface 31 are sequentially queued into an input buffer 22 in accordance with the receiving order.

A command processor 23 comprising a microcomputer and an ROM to store a command processing program extracts the commands and data which were queued in the input buffer 22 in accordance with the same order as the receiving order, sequentially interprets and processes them, and converts into bit map data to be printed and information to control a print mechanism 24. The print mechanism 24 receives the bit map data to be printed and the control information and prints.

A status monitor 25 is constructed by sensors to monitor the operation of the print mechanism 24 and a mechanism to interpret signals from the sensors. Information obtained by the status monitor is always stored as newest information into a status information memory 26.

A panel controller 27 comprising a microcomputer and an ROM to store a panel control program displays the newest information stored in the memory 26 to a panel display 28. The panel controller 27 displays the newest information stored in the status information memory 26 to the panel display 28. As a panel display, there is a display to inform an error or an operating status by a light-on of an LED, a display to display characters by an LCD, or the like. A panel switch 29 is a key switch annexed to the same panel portion. Various instructions are made to the printer by the panel switch 29. The instruction by the operation of the panel switch 29 is interpreted by the panel controller 27. A command is generated to the command processor 23 or print mechanism 24 in accordance with the contents of the instruction. For example, when the operation of the on-line/off-line is performed, the interface is halted or resumed for the interface circuit 21. When a head cleaning is designated, it is instructed to the print mechanism 24.

In the conventional printer as mentioned above, the operation to the printer is instructed by a switch on the panel while looking at a message on the display annexed to the operation panel of the printer.

FIG. 1 shows an example of a construction of the system of the invention. In a manner similar to FIG. 2, reference numeral 10 denotes the host computer and 20 indicates the printer. Reference numerals 31, 32, and 33 denote interface cables for transferring information of different functions. There is no need to physically separate those interface cables to three kinds of cables. In the printer, an interface controller 41 controls an information exchange with the host computer and also includes a function of the interface circuit 21.

In the invention, as commands which are sent from the host computer to the printer, there are two kinds of commands such as printer command and urgent command.

A command which is sent through the I/F cable 31 is called a printer command to control the whole printing operation of the printer. All of the commands and data which are sent from the host computer to the printer hitherto are the printer commands and are the same as those described in FIG. 2 mentioned above. Processes of the printer commands are similar to those in the conventional printer. As described in FIG. 2, the commands are queued into the input buffer 22 in accordance with the receiving order and are processed by the command processor 23 and are printed by the print mechanism 24. In a manner similar to the conventional printer, the status monitor 25 also stores the newest information into the status information memory 26 as described in FIG. 2.

A command which is sent through the I/F cable 32 is called an urgent command and is a command peculiar to the invention. When the urgent command is received, it is immediately transmitted to an urgent command processor 42 comprising a microcomputer and an ROM to store an urgent command processing program and is processed. The urgent command includes urgent executing commands which the printer has to immediately execute. For example, a command to temporarily halt or resume the printing operation, a command to clean the printer head, and the like are included. Further, a command to inquire the status of the printer is also included in the urgent executing command. Those commands are immediately executed asynchronously with the commands stored in the input buffer 22. The processes of the urgent commands will now be described separately with respect to two kinds of the urgent executing command and the status inquiry command.

In case of the status inquiry command, the urgent command processor 42 extracts necessary information from the status information memory 26 in accordance with the contents of the inquiry and supplies to the interface controller. The interface controller returns the status information to the host computer through the I/F cable 33.

In case of the urgent executing command, the urgent command processor 42 immediately processes it and generates instructions to the command processor 23, print mechanism 24, and panel controller 27 in accordance with the contents of the command.

The panel controller 27 displays the newest information of the status information memory 26 to the panel display 28 in a manner similar to the conventional printer. However, the panel operation from the panel switch 29 is transferred to the urgent command processor 42 and is processed here. This is because it is integrally handled together with the urgent command from the host computer.

The host computer 10 displays an operation picture plane of the printer or an instructing picture plane to the printer onto a CRT screen 11, sends the printer command or urgent command to the printer in accordance with an instruction of the operator, and executes the process according to an instruction of the operator. The host computer 10 also sends a status inquiry command, obtains information regarding the status of the printer, displays the necessary information onto the CRT screen, and informs the operator.

Figure 4:
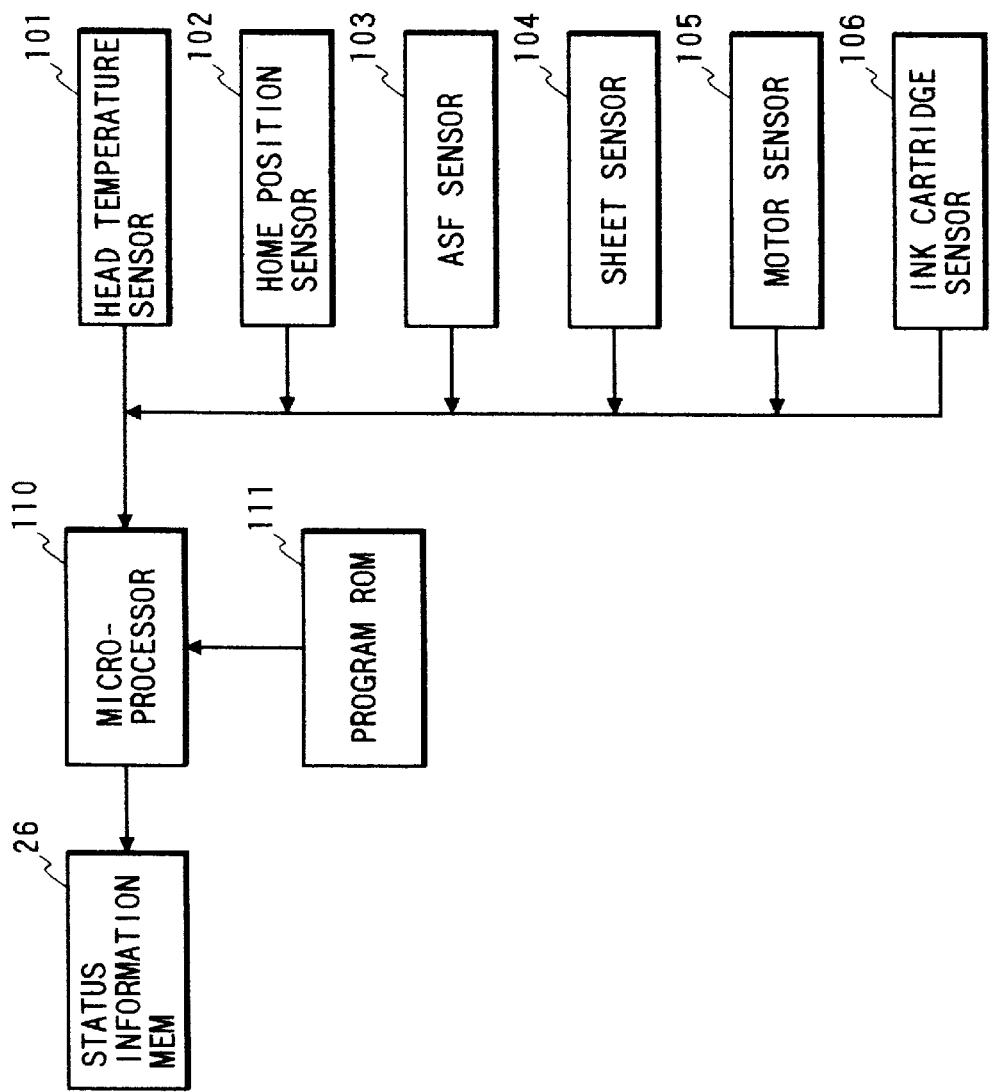
FIG. 4 is a diagram showing an embodiment of a status monitor 25.

FIG. 4 shows an embodiment of the status monitor 25 in the case where the print mechanism 24 is a bubble jet printer.

Reference numerals 101 to 106 denote sensors to monitor the operating status of the print mechanism.

A head temperature sensor 101 monitors a temperature state of a head nozzle. By detecting an abnormal high temperature upon printing, it is detected that no ink is supplied to the nozzle.

A home position sensor 102 is a photosensor to adjust the home position of a print head. The sensor 102 can also detect that there is a fault in the carriage movement.

An ASF (auto sheet feeder) sensor 103 detects an abnormality of the pull-in operation of a sheet by an automatic feeder.

A sheet sensor 104 is a photosensor to detect the presence or absence of the sheet at a printing position. The absence of the sheet (no sheet is supplied) and a sheet jamming (the sheet is jammed and is not moved even by feeding) are detected by the sensor 104.

A motor sensor 105 detects an abnormality of a motor to rotate the head nozzle.

An ink cartridge sensor 106 is a photosensor to detect the reflected light from the ink cartridge surface. Whether an ink cartridge has been attached or not and whether there is an ink in the cartridge or not can be detected by the sensor 106.

Detection signals from the sensors 101 to 106 are always monitored by a microprocessor 110 and various abnormalities are detected with the aid of a program in an ROM 111. The abnormality information detected is written into the status information memory 26. The microprocessor 110 and ROM 111 may be exclusive-use component elements to construct such a status monitor or can be also realized by using only one set of component elements provided for the printer.

Figure 5:
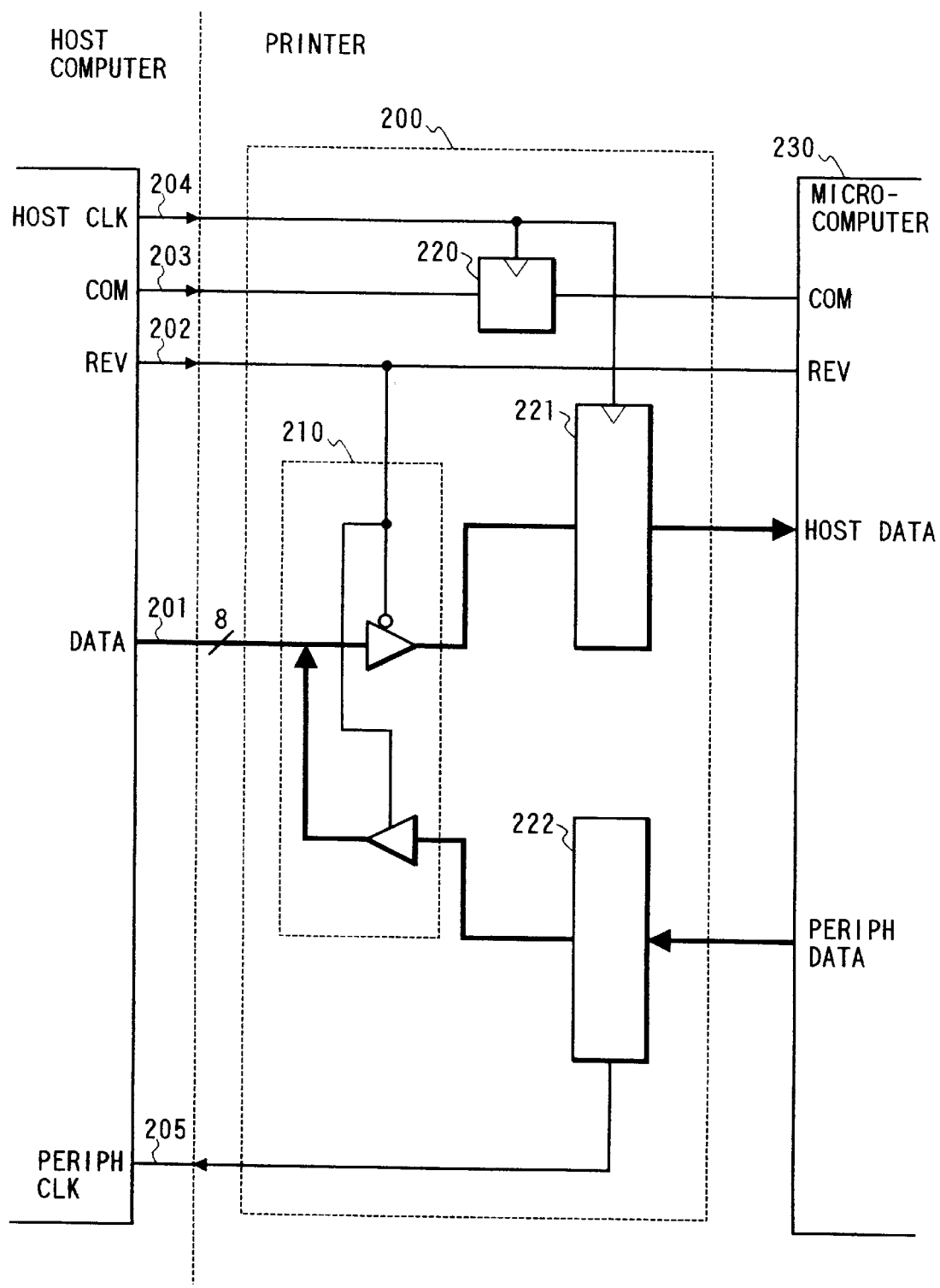
FIG. 5 is a diagram showing an embodiment of an interface controller 41.

FIG. 5 shows an example of a construction of an interface controller of the invention.

A case where a centronics interface which is used as a standard interface for the printer is used as a physical interface will now be described as an example. Although the centronics interface is inherently used for a data transmission in a single direction, according to the standard plan P1284 of IEEE, there has been proposed a system using the interface for a bidirectional data transmission. FIG. 5 relates to a using method in an ECP mode in the above standard plan and describes only the signals regarding the invention.

In the diagram, a left portion from a broken line in the diagram shows the host computer and a right portion shows the printer. Reference numeral 200 corresponds to the interface controller 41 on the printer side. A DATA line 201 is a bi-directional data signal line of 8-bit parallel. All of commands and status information are transmitted and received through the signal line 201. An REV line 202 denotes a signal from the host computer and decides the direction of the DATA line. A circuit portion 210 corresponds to a direction switching circuit of the DATA line and functions in a manner such that when the signal REV is at the 0 level, the direction from the DATA line to the host is valid and, when the signal REV is at the 1 level, the direction from the printer to the host is valid. A COM line 203 denotes a signal from the host and designates whether the DATA signal from the host indicates a print command or an urgent command. An HostClk 204 denotes what is called a strobe signal for designating a period of time in which DATA and COM from the host are valid. When the signal HostClk once drops and is again rises, the signals DATA and COM are respectively fetched into latches 221 and 220 and the printer receives those signals. Reference numeral 230 denotes a microcomputer on the printer side. The microcomputer 230 can read out REV of 202 as a signal from the host and COM and HostData received in the latches 220 and 221. When HostData is latched, this fact is informed to the microcomputer by an interruption signal. When data is transmitted from the printer to the host, it is confirmed that the REV signal is at the 1 level. The data is written into a latch 222 for transmission. When the data is written, a pulse signal is automatically generated to a strobe signal PeriphClk 205 and informs the host of a timing to receive HostDATA.

In case of a system which can embody only a nibbling mode in the standard plan P1284, it is impossible in principle to distinguishably send two kinds of commands (printer command and urgent command) from the host computer to the printer. However, when a special command is sent, by using an extending function of negotiation shown in the standard plan P1284, the urgent command can be distinguishably transmitted.

Figure 6:
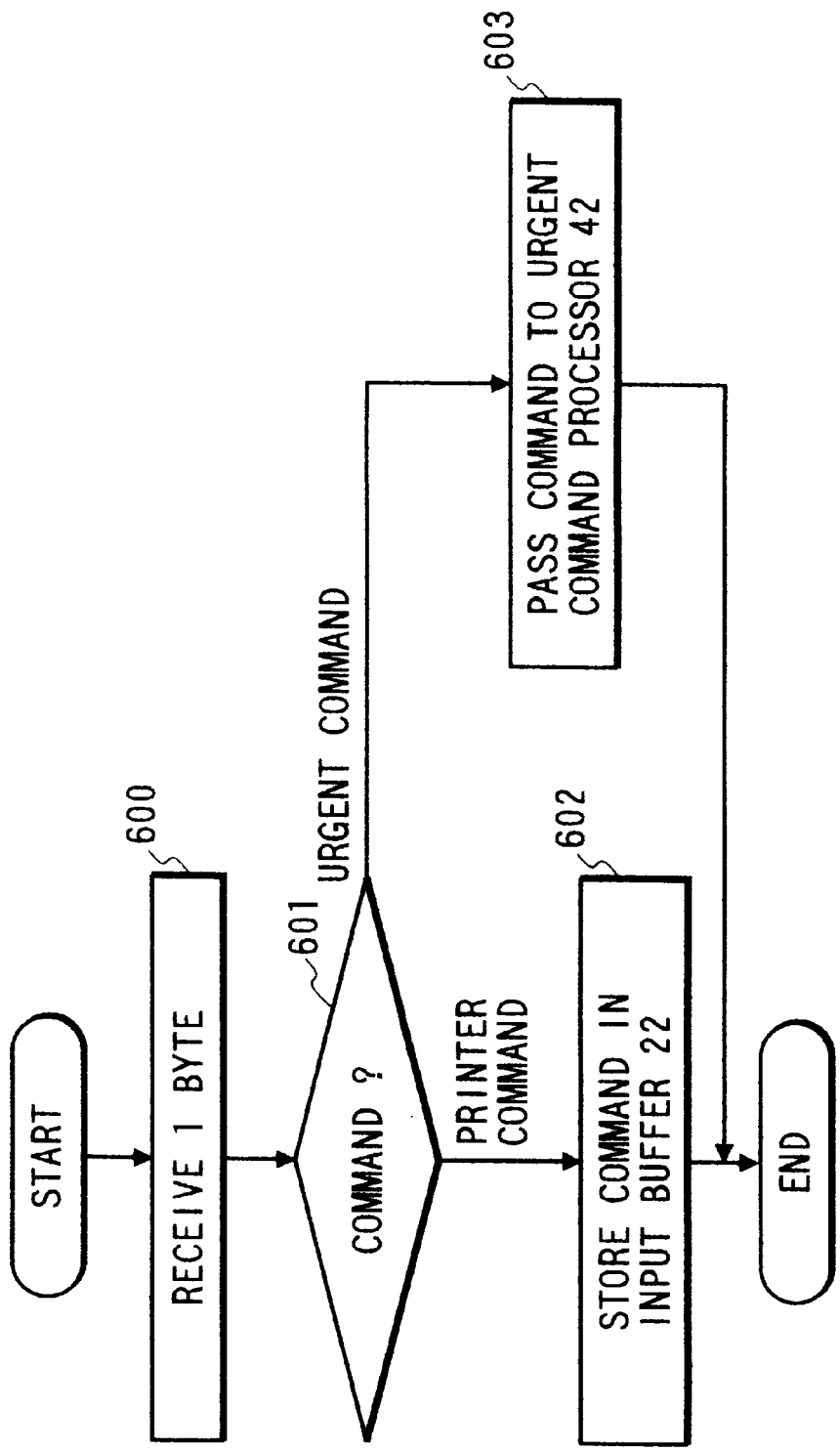
FIG. 6 is a diagram showing a flowchart for explaining the operation of the interface controller 41.

FIG. 6 is a flowchart for explaining the operation of the microcomputer 230 of the I/F controller. The operation shown in the flowchart is activated by an interruption by the reception of HostData of the description in FIG. 5 and is executed each time a code of one byte is received from the host computer (step 600). The microcomputer 230 reads out COM in the latch 220 and HostData in the latch 221 which were described in FIG. 5. When COM is at the 0 level, it is judged that HostData is a print command and, when COM is at the 1 level, it is judged that HostData is an urgent command (step 601). In case of the printer command including the print data, it is stored into the input buffer 22 (step 602). In case of the urgent command, it is transferred to the urgent command processor 42 and the execution of the process is immediately promoted (step 603).

Although the above operation has been described by the flowchart, it can be executed at a higher speed by realizing it by a hardware without using the microcomputer.

Figure 7B:
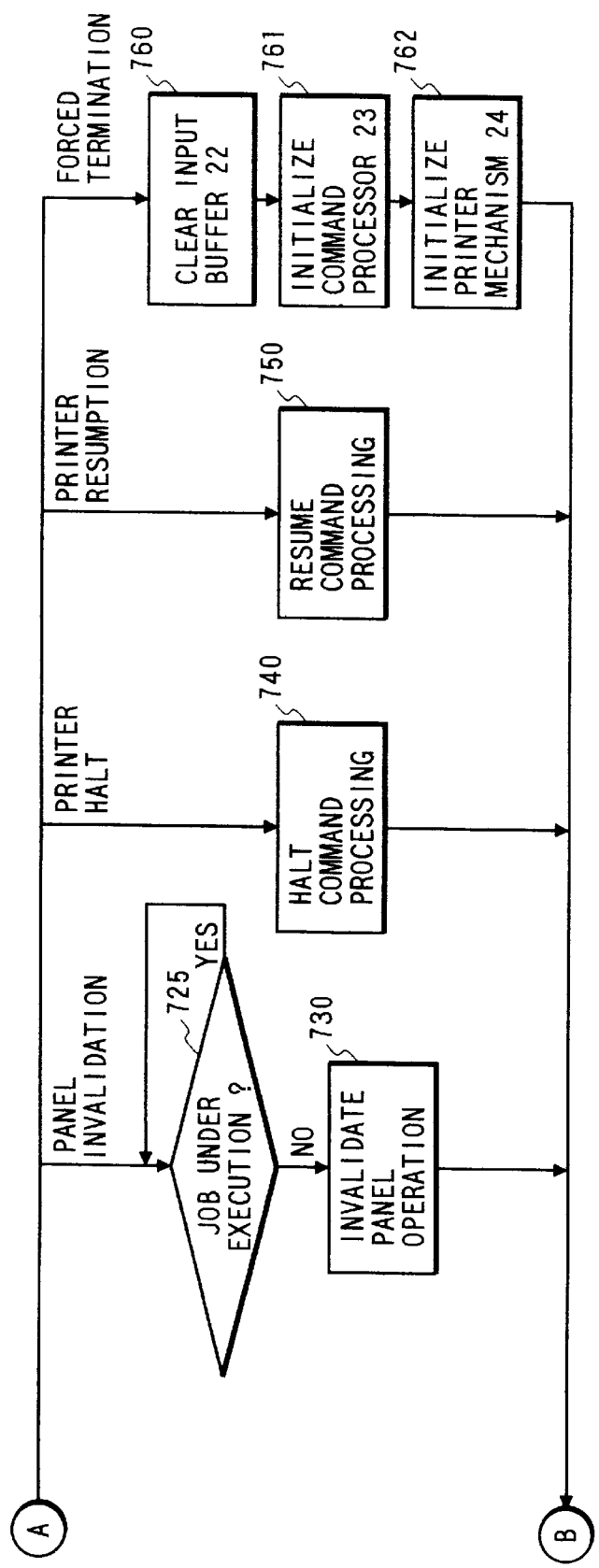
FIG. 7 is comprised of FIGS. 7A and 7B showing flowcharts for explaining the operation of an urgent command processor 42.

FIGS. 7A and 7B are flowcharts for explaining in detail the operation of the urgent command processor.

In step 603 in FIG. 6, the urgent command processor 42 receives the urgent command and starts the operation (step 700). In the embodiment, each of the urgent commands is expressed by one byte. First, a code of the urgent command is compared and is distributed to a target process (step 701).

In case of a status information inquiry command, step 710 follows and inquiry information is read out by the status information memory 26 and is combined to the code of one byte and is transferred to the I/F controller. In the embodiment, each of the status information is also expressed by one byte. As described in FIG. 4, the interface writes the information into the latch 222 for transmission, thereby transmitting to the host. There are various kinds of inquiry commands as a status information inquiry command. Although not described in the diagram, in the case where the inquiry contents relate to a free block size of the input buffer, the free block size of the buffer is calculated from the buffer management information in the input buffer 22, is converted into a format to express by one byte, which will be explained hereinlater, and returns to the host computer via the I/F controller.

In case of a command for making a panel operation valid or invalid, step 720 or 730 follows. An instruction to make the panel operation valid or invalid is sent to the panel controller 27. The operation to validate or invalidate the panel operation in the middle of one print job is very troublesome to the operator. To avoid it, according to the invention, the following measures are taken. The command processor 23 always transfers and stores an execution status of the job into the status information memory 26. For example, information indicating which job is being executed or which page is being processed or the start/termination of the job is notified. The urgent command processor monitors those information. When the job is under execution, the apparatus waits for the end of the job (steps 715, 725) and generates an instruction to validate or invalidate the panel operation to the panel controller 27.

In case of a command for halting (corresponding to the function of the conventional off-line key) or resuming (corresponding to the function of the conventional on-line key) the printer operation, the processing routine advances to step 740 or 750 and an instruction to temporarily halt or resume a print job is generated to the command processor 23.

In case of a command to forcedly finish the print job, step 760 follows, the input buffer 22 is cleared, and the command processor 23 is initialized (step 761). A sheet under printing is forcedly ejected and the print mechanism 24 is initialized (step 762). The job under execution is halted.

Although not shown, in case of a command to clean the print head, the head cleaning is instructed to the print mechanism 24. Further, in case of a command to feed the paper, an instruction is generated to the print mechanism 24 so as to deliver the sheet.

As mentioned above, the processes of all of the urgent commands are executed under control of-the urgent command processor.

As will be understood by comparing FIG. 1 of the invention and FIG. 2 of the conventional apparatus, the printer control method according to the invention can be realized by adding the urgent command and by assembling the urgent command processor to process it. This means that the present method can be applied to the conventional various printers. It also means that the printer control method of the invention can be easily realized without losing the conventional developed resources.

Figure 3:
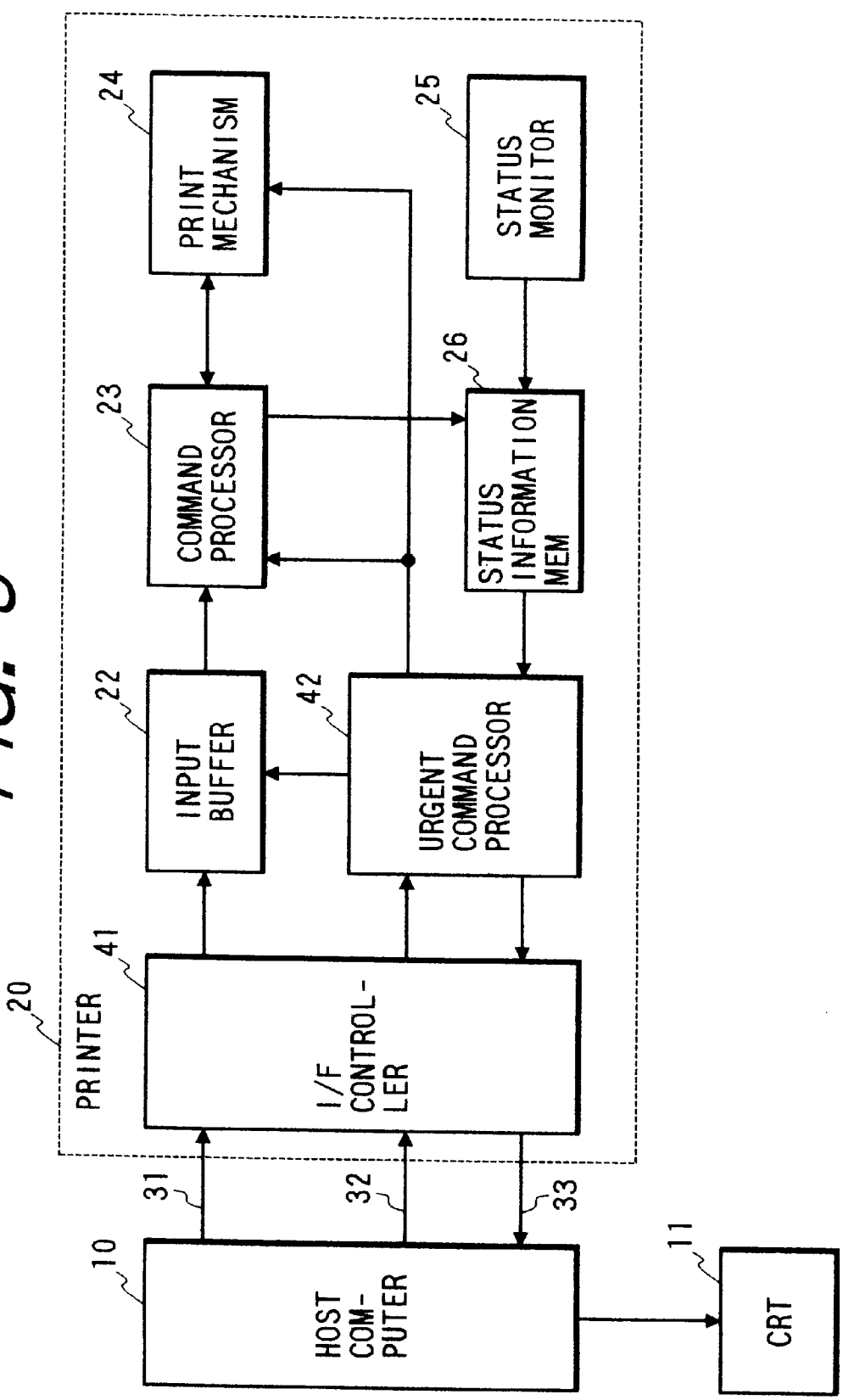
FIG. 3 is constructional diagram of a another embodiment of the invention.

FIG. 3 relates to another embodiment of the invention and shows an example in which the operation panel of the printer is eliminated. By the invention, all of the operations which were hitherto performed from the panel of the printer can be instructed from the host computer. All of the information displayed on the panel of the printer can be displayed more easily and in more detail onto the screen of the host computer. Therefore, even if the panel controller 27, panel display 28, and panel switch 29 in FIG. 1 are not provided, a printer without any trouble can be realized. All of the component elements 10 to 42 in the diagrams function in substantially the same manner as those described in FIG. 1.

FIGS. 8 and 9 show lists of urgent commands which are used in the invention. Each of the urgent commands is expressed by one byte. Among them, FIG. 8 shows a list of status inquiry commands and FIG. 9 shows a list of urgent executing commands.

FIGS. 10 to 16 show lists of status information which is returned to the host computer. Each of the status information is also expressed by one byte.

In FIG. 16, the capacity of the free block size of the input buffer is expressed by an exponential part of three bits in which a mantissa part of five bits and 4 are set to a base. According to this expression, a range which can be expressed by one byte lies within a range from 1 to 496 K (31*4^7). On the other hand, when the free block size of the input buffer is expressed by an ordinary integer, in case of one byte, only a range of 1 to 255 can be expressed. In case of two bytes, only a range of 1 to 64 K can be expressed. In the embodiment, by aligning all of the status information to one byte, the hardware is simplified. When considering how the host computer handles the free block size information, when the remaining free block size is small, the user wants to correctly know the remaining number of bytes which can be received. When the free block size of the input buffer is enough, a value of a few bytes of a small digit is not interested but to which extent a work to form the print data should be preferentially performed is judged. Therefore, a rough value about the degree of free block size is required. To express such a target value, the exponential expression as in the embodiment is suitable.

According to the invention, by the command which is generated from the host computer and the status information which is sent from the printer, all of the displays and operations which can be performed by the operation panel of the printer can be executed by the screen on the host computer side and the object of the invention can be accomplished.

Further, according to the invention, the instruction which cannot be performed by only the panel operation of the printer hitherto can be executed by only the screen operation on the host computer side. For example, the print job can be halted or the contents of errors can be displayed in detail or its recovering method can be also displayed.

Further, according to the invention, the operation panel of the printer can be designated to an invalid status. A situation such that the other person carelessly touches the panel of the printer and the printing fails can be prevented. Such a failure is likely to occur when the printer is shared or the like.

Further, the free block size of the input buffer of the printer can be known on the host computer side and efficient multi-task processes can be performed. Namely, since the printer previously knows an amount of data which can be received, if its capacity is small, it is possible to schedule so that the host CPU is distributed to other works.

According to the invention, further, the method can be realized by merely adding an urgent command to the conventional printer and by merely assembling the urgent command processor and can be adapted to various printers and can be easily developed without losing the conventional developed resources.

According to the invention, moreover, the operation panel of the printer can be eliminated, the production costs can be reduced, and the printer of low costs can be provided.

According to the invention, the operation screen of the printer can be displayed on the screen of the host computer having a high resolution and a wide display range. The more detailed operation screen which can be understood easier than the operation panel of the conventional printer can be realized.

Second Embodiment

Figure 18:
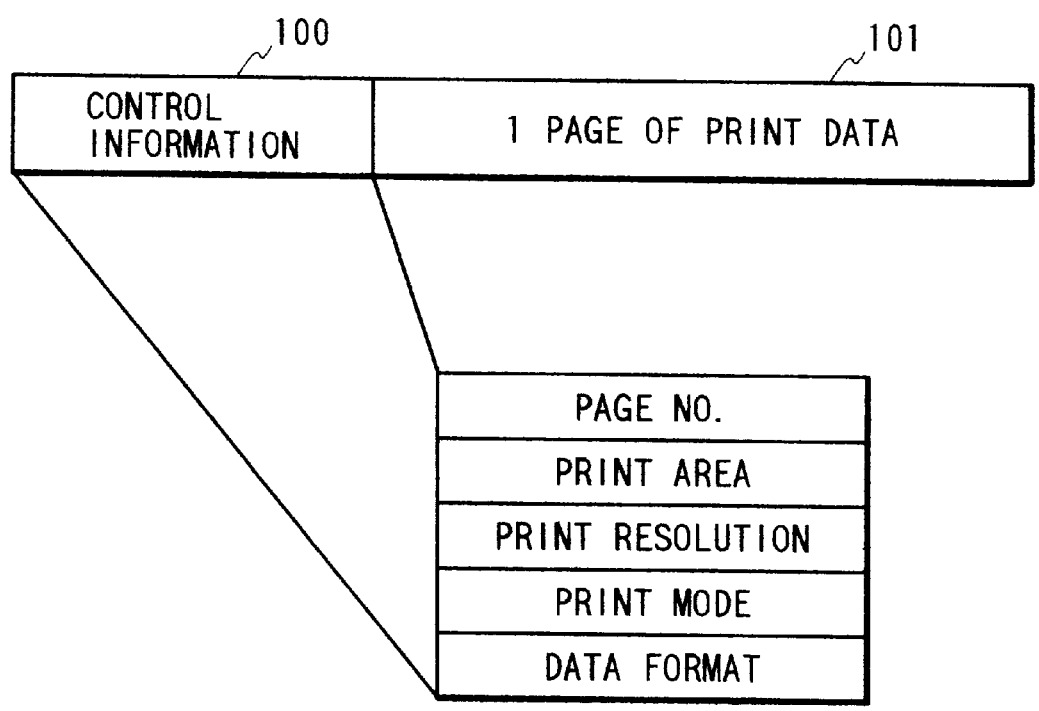
FIG. 18 is a diagram showing an example of printer commands which are used in the invention.

FIG. 18 shows an example of printer commands which are transmitted from the host computer to the printer in the invention. It is an example of a construction of commands corresponding to one page. Generally, the host computer transmits information about a print format of the relevant page prior to transmitting the print data of each page to the printer. The information includes information indicative of a print range in the paper, information indicative of a resolution of printing, information to select a print mode showing a level of a print quality or the like, information to designate a format of transmission of the print data, and the like. According to the invention, in addition to the information as mentioned above, the host computer transmits the page number of the print page, generally, information to designate a page ID code together with them. The printer manages the page ID code in comparison with the relevant page. In case of transferring the page number to the host computer, such a transmission is performed by the page ID code. Namely, the printer uses it as a common page ID code between the host computer and the printer.

Figure 17:
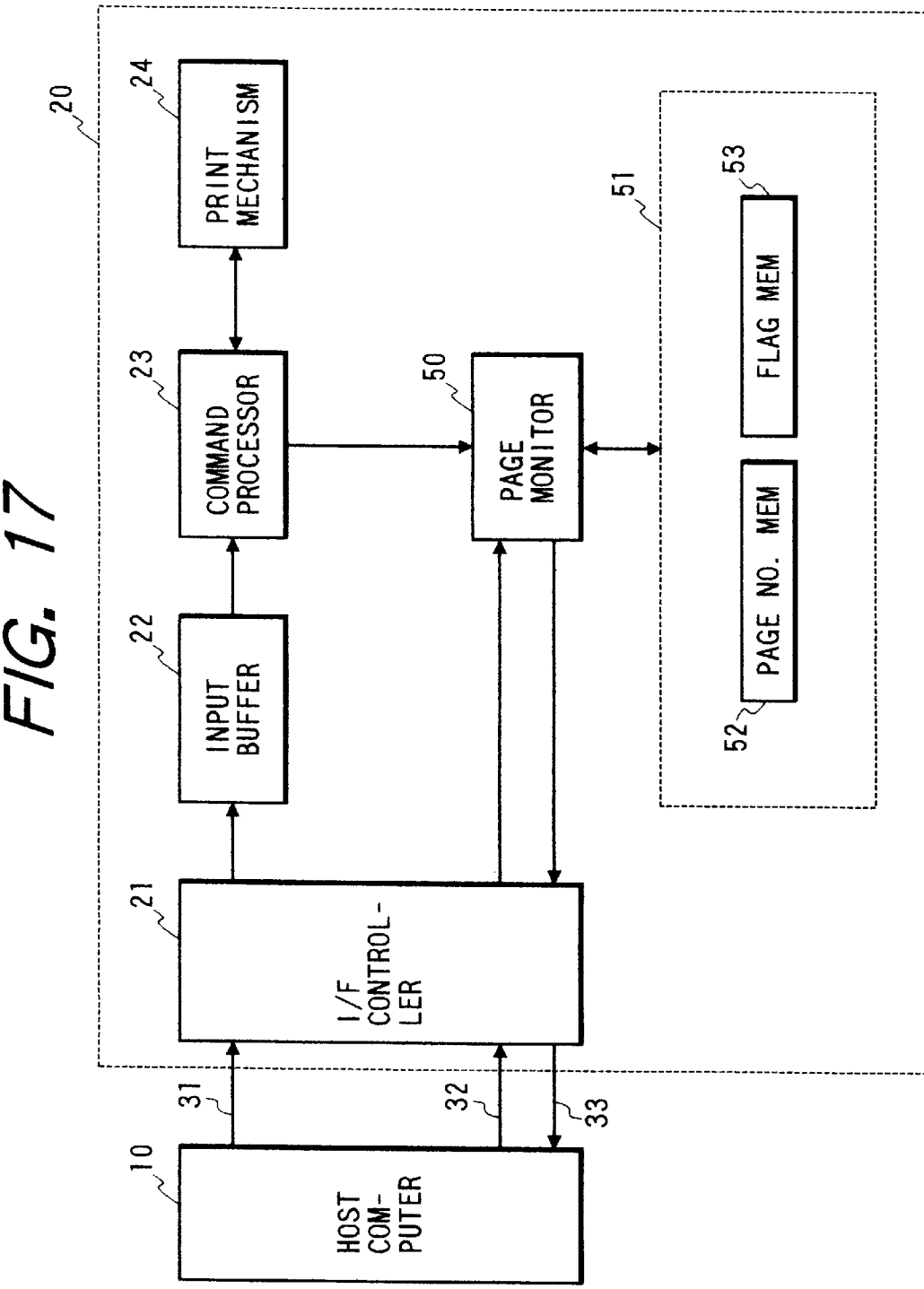
FIG. 17 is a whole constructional diagram of the invention.

FIG. 17 shows an example of a construction of the invention. Reference numeral 10 denotes the host computer; 20 the printer connected to the host computer through the interface controller 21; and 31, 32, and 33 interface cables to connect them. Although the I/F cables transmit information which are physically different, there is no need to physically divide them into three kinds of cables. The I/F controller 21 receives the printer commands from the host computer through the line 31. As described in FIG. 2, the printer commands include all of the control information and data for the printing of the printer and the page number designation information is also included. Those commands are queued into the input buffer 22 in accordance with the receiving order and are processed by the command processor 23 comprising the microcomputer, ROM to store a command processing program, and RAM which is used for a command process and are printed by the print mechanism such as ink jet printer, laser beam printer, or the like. A page monitor 50 in the embodiment can be applied to a printer such that after the print mechanism 24 finished the printing of one page and perfectly ejected the paper, the command processor 23 instructs the print mechanism 24 so as to feed the sheet of the next page. As shown in the diagram, the page monitor 50 comprising the microcomputer and the ROM to store the page monitor processing program has a memory 52 to record the page number under printing into a page monitor memory 51 and a flag memory 53 of one bit indicative of a sheet feeding status of the paper of the relevant page, thereby monitoring the printing status. That is, the page number under printing is stored into the memory 52. Further, as a progressing situation of the page, when the value in the flag memory 53 is equal to 1, this means that the paper of the relevant page is fed. When it is equal to 0, this means that the printing of the relevant page had been finished and the paper was delivered.

When one page is printed, the command processor 23 first interprets the information of a control information unit 100 in FIG. 18 and specifies the page number. The command processor 23 instructs the print mechanism 24 so as to feed the paper. After completion of the correct paper feeding, the print mechanism 24 notifies the command processor 23 of such a fact. The command processor 23 informs the page monitor 50 of the completion of the paper feeding in addition to the page number. The page monitor 50 writes the page number received into the memory 52 and records "1" into the flag memory 53, showing a fact that the printing of the new page was started. After that, the command processor 23 transmits all of the data of one page to the print mechanism 24 and subsequently sends a paper delivery command. When the paper delivery is correctly completed, the print mechanism 24 notifies the command processor 23 of such a fact. In response to such a notification, the command processor 23 notifies the page monitor 50 of the completion of the sheet delivery. The page monitor 50 writes 0 into the flag memory 52 and stores a fact that the paper on which the page that is expressed in the memory 52 was printed has been completed.

The host computer inquires the page which is at present being printed through the line 32. Generally, it is possible to specify and inquire various information from the host computer to the printer or to transmit various commands. The commands which are sent through the line 32 are hereinafter referred to as urgent commands and are distinguished from the printer commands which are sent through the line 31. As mentioned above, generally, in case of transmitting the urgent command, the line 32 requires a function which can transmit a code. When it is an object to inquire only the ID number of the page under printing, it is sufficient to use one signal line. In response to the inquiry, the printer returns the ID number of the page under printing to the host computer through the line 33.

Since the details of the I/F controller 21 in the embodiment are similar to those described in FIG. 5 mentioned above, their description is omitted here.

Figure 19:
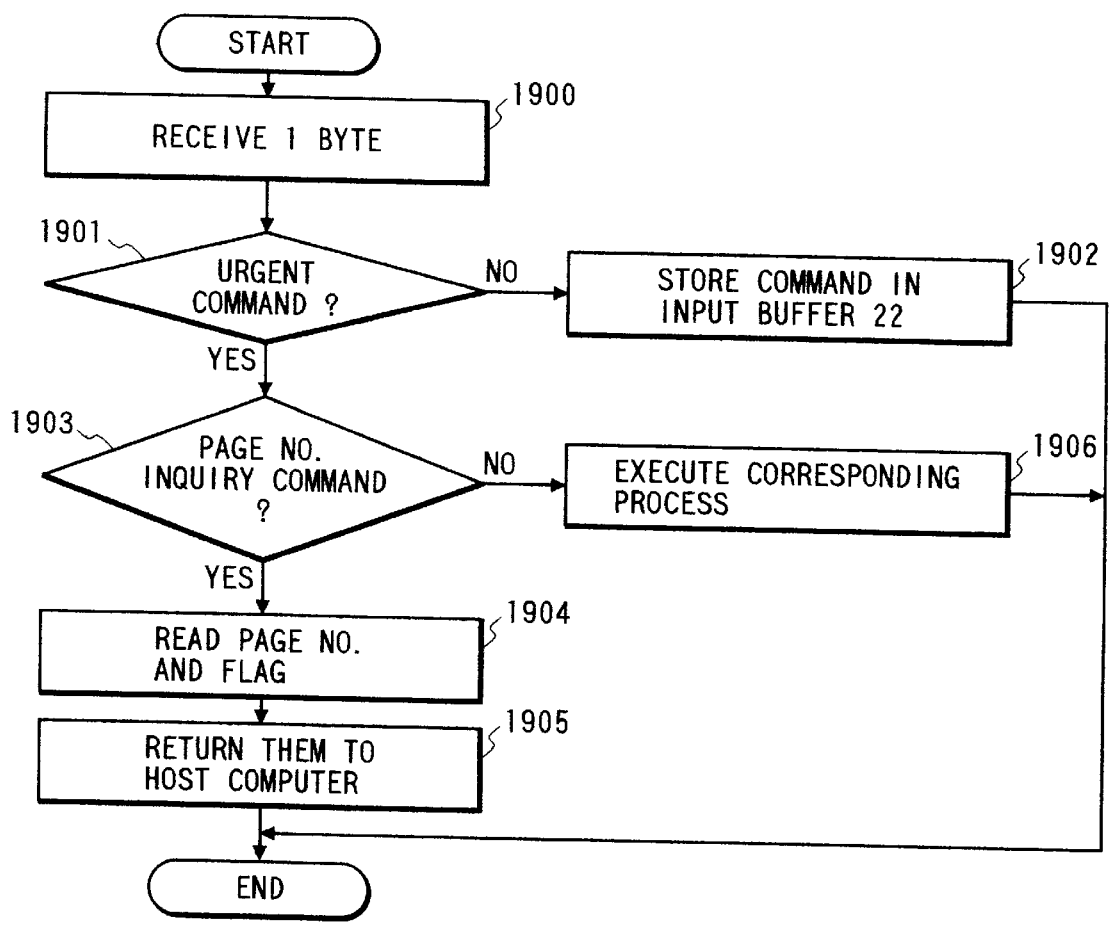
FIG. 19 is a flowchart for explaining the operation to return a page number in the invention.

FIG. 19 is a flowchart for explaining the operation which is processed by the printer in response to the number inquiry command. The operation shown in the flowchart is activated by the interruption by the reception of HostData in the description according to FIG. 5 and is executed each time a code of one byte is received from the host computer (step 1900). The microcomputer 230 reads out COM and HostData in the latches 220 and 221 described in FIG. 5. When COM is at the 0 level, it is judged that HostData is a printer command and, when COM is at the 1 level, it is judged that HostData is an urgent command (step 1901). In case of the printer command, it is stored into the input buffer 22 (step 1902). In case of the urgent command, the code of the urgent command is compared and classified and is distributed to each process (step 1903). In the embodiment, all of the urgent commands are expressed by one byte. When the kind of urgent command indicates an inquiry command of the page number under printing, step 1904 follows. The microcomputer 230 inquires the page number under printing and the paper feeding status to the page monitor 50. The page monitor 50 reads out the page number under printing from the memory 52, reads out a paper feeding status bit from the memory 53, couples them, and transfers the result as one code to the I/F controller. The I/F controller returns the status information to the host computer through the line 33. As one code, for example, by the code of one byte, the page ID number can be allocated to bits 0 to 6 and the paper feeding status bit can be allocated to bit 7. In step 1903, when it is judged that the command is not the page inquiry command, a process corresponding to the command (print job forced termination command, head cleaning command, etc.) is executed (step 1906).

Figure 20:
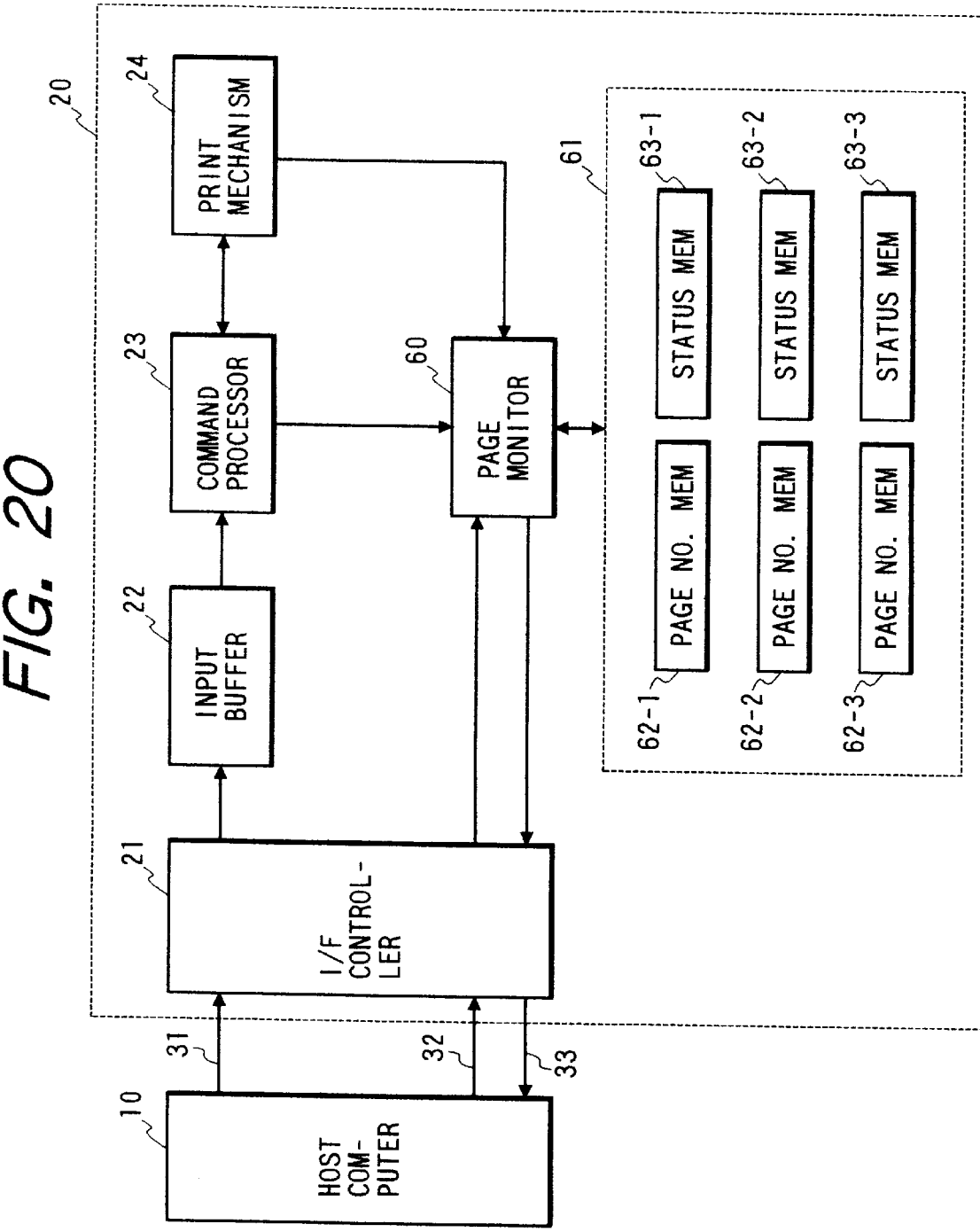
FIG. 20 is a diagram showing another embodiment of the invention.

FIG. 20 shows another embodiment of the page monitor in FIG. 17. In this example, the print mechanism 24 has a mechanism for queueing commands which are received from the command processor 23 and can be applied to the case where an instruction to print the next page can be received before the end of the printing of one page. As shown in the LBP, the invention can be also applied to a print mechanism such that even after the printing was finished, there are a fixing step and the like and information to indicate until which step the process has been finished is important to reprint or the like.

In the embodiment, a page monitor 60 has a mechanism to simultaneously monitor a plurality of continuous pages. A page monitor memory 61 has: memories 62-1, 62-2, and 62-3 to store the page ID numbers of the three pages under processing; and memories 63-1, 63-2, and 63-3 to hold the processing status information of those pages. When a value is equal to 1, a processing status memory 63-X indicates that the data process of the relevant page has been started. When the value is equal to 2, it is shown that the printing has been started. When the value is equal to 3, it is shown that the printing has been finished. When the value is equal to 4, it is shown that the fixing has been finished. When the value is equal to 0, it is shown that the paper delivery has been finished. When printing one page, the command processor 23 first interprets the information of the control information unit 100 in FIG. 18 and specifies the page number. By the start of the data process of the new page, the command processor 23 notifies the page monitor 60 of the page number. The page monitor writes the page number into a vacant location from the head of a page ID number memory. Further, the page monitor writes 1 indicative of the start of the process into a processing status memory corresponding to it. The subsequent processes are largely different from those in the embodiment of FIG. 1. The progressing situation of each page is monitored on the basis of process completion information from the print mechanism 24. The subsequent processes will be described with reference to flowcharts of FIGS. 21 and 22.

Figure 21:
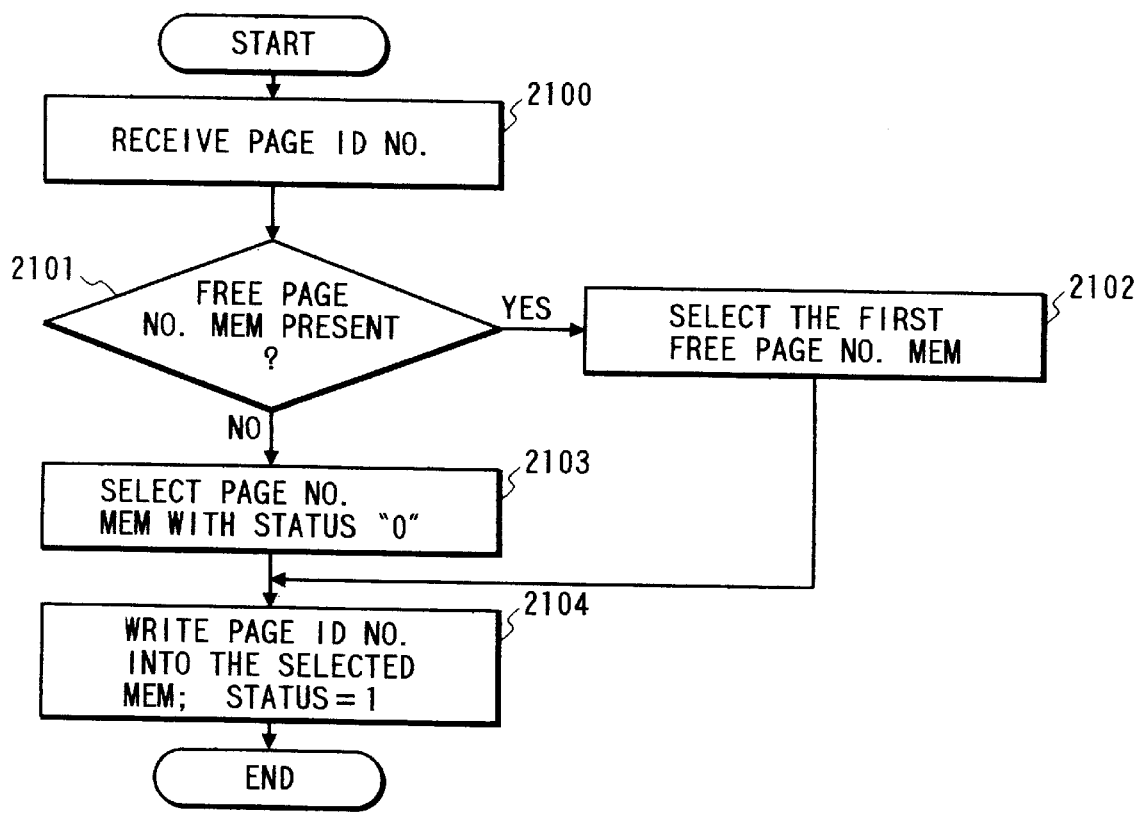
FIG. 21 is a flowchart for explaining the operation in another embodiment.

FIG. 21 shows processes after the command processor 23 notified the page monitor 60 of a new page number. When the new page ID number is received (step 2100), the page processor 60 searches whether the free page ID number memory exists in the page monitor memory 61 (step 2101). If YES, the first free memory (memory of the smallest value of X in 62-X and 63-X) among the free memories is used (step 2102). When no free memory is found in step 2101, the memory in which the processing status information is equal to 0, namely, the memory of the page in which the paper delivery has been completed is selected (step 2103). This is because it has not already required the management. The page ID number is written into the memory selected in step 2102 or 2103 and 1, namely, the start of the data process is written into the processing status information (step 2104).

Figure 22:
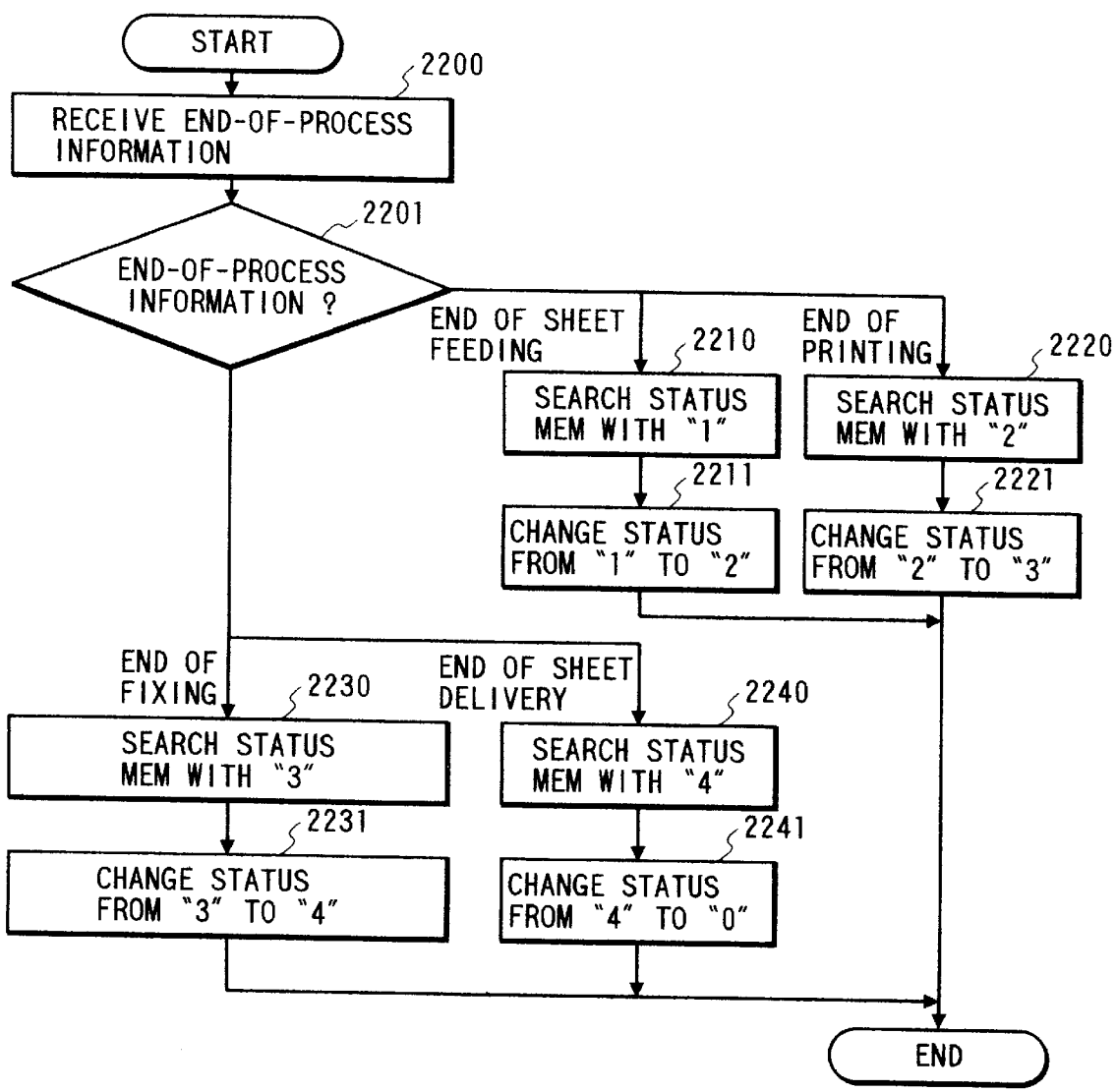
FIG. 22 is a flowchart for explaining the operation in another embodiment.

FIG. 22 shows processes after the page monitor 60 received the process completion information from the print mechanism 24. When the page monitor 60 receives the process completion information from the print mechanism 24 (step 2200), the process completion information is classified (step 2201).

When the completion information indicates the completion of the paper feeding, the process status memory in which a value is equal to 1, namely, the page under data processing is searched (step 2210). The status memory is changed from 1 to 2, namely, a fact that the operation has been shifted to a status under printing is recorded (step 2211).

When the completion information indicates the completion of the printing, the process status memory of 2, namely, the page under printing is searched (step 2220). The status memory is changed from 2 to 3, namely, a fact that the operation has been shifted to a status under fixing is recorded (step 2221).

When the completion information indicates the completion of the fixing, the process status memory of 3, namely, the page under fixing processing is searched (step 2230). The status memory is changed from 3 to 4, namely, a fact that the operation has been shifted to a status under printing is recorded (step 2231).

When the completion information indicates the completion of the sheet delivery, the process status memory of 4, namely, the page under data processing is searched (step 2240). The status memory is changed from 4 to 0, namely, a fact that the sheet delivery has been completed is recorded (step 2241).

In the embodiment, in the case where there is an inquiry of the page under processing from the host computer, the page monitor 60 reads out all of the page monitor memory 61 and returns to the host computer through the I/F controller 21 in a manner similar to the embodiment of FIG. 17. In this case, the information which is returned consists of a plurality of bytes.

Figure 23:
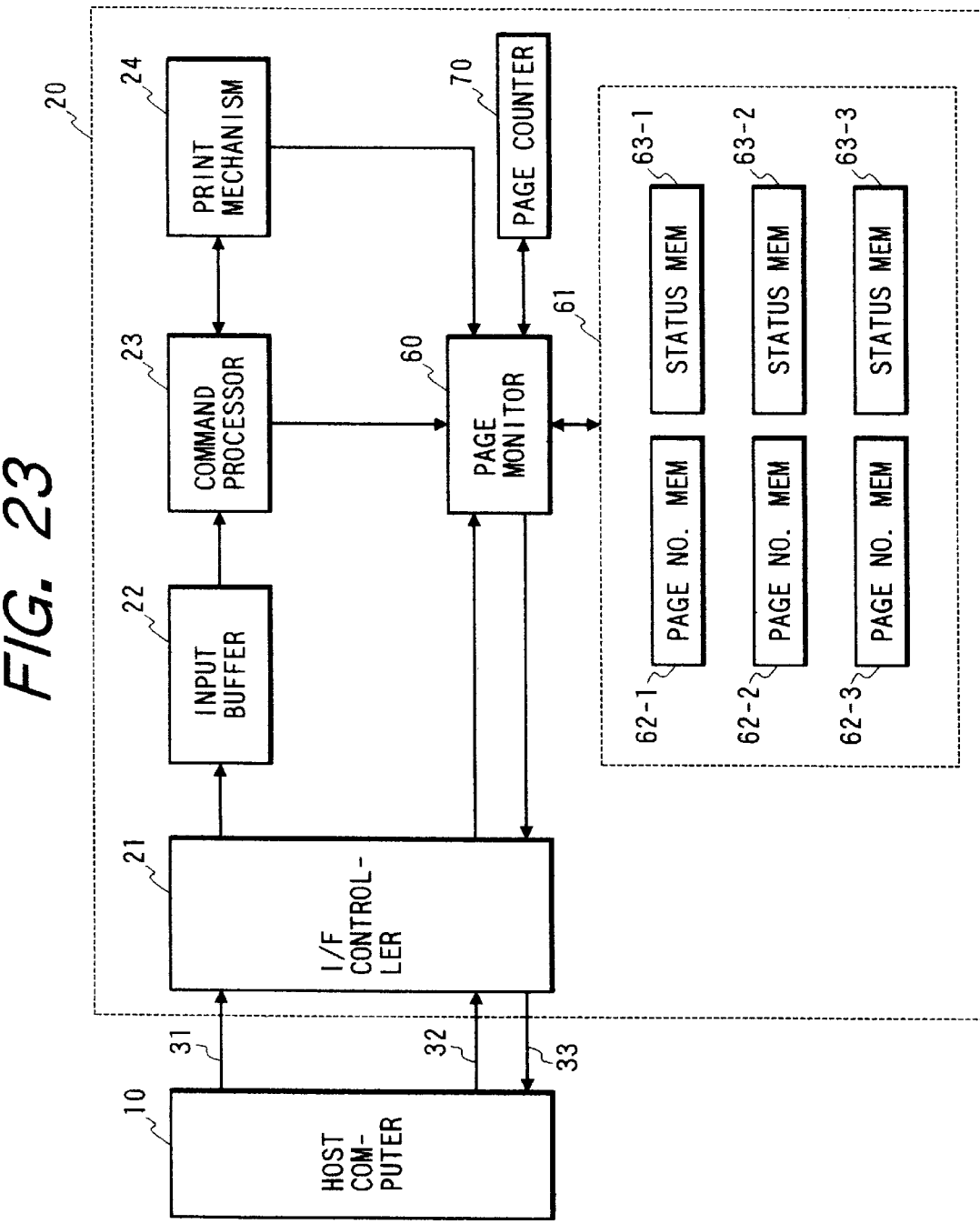
FIG. 23 is a diagram showing another embodiment of the invention.

FIG. 23 shows a constructional diagram of another embodiment and is similar to FIG. 20.

Figure 24:
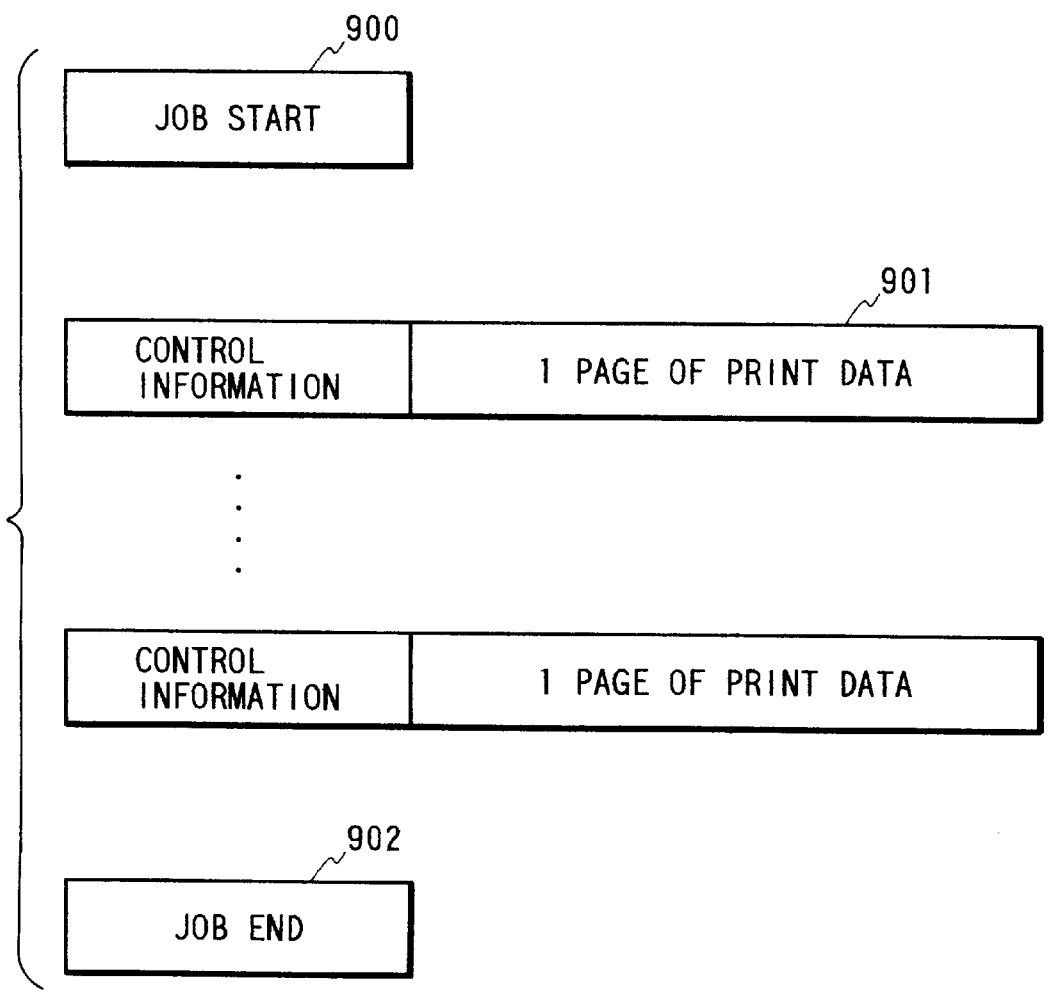
FIG. 24 is a diagram showing an example of printer commands which are used in another embodiment.

FIG. 24 shows an example of printer commands which are transmitted from the host computer to the printer. This example relates to an example of a construction of a group of commands corresponding to one document or print job. Reference numeral 900 denotes a command which is first transmitted and means the start of the job. Reference numeral 901 denotes a train of a plurality of commands of the number as many as the number of pages of the document. The command train 901 realizes the actual print contents. However, a page number designation doesn't exist in the control information unit 901. Reference numeral 902 denotes a command indicative of the termination of the print job. However, it is also possible to omit the command 902.

The operation of FIG. 23 is substantially the same as the operation described in FIG. 20. When the print job start command is received, the command processor 23 notifies the page monitor 25 of the start of the job. The page monitor clears a page counter 70 in which the whole page monitor memory was cleared, thereby preparing for a new job. When a process of the control information unit of a new page is started, the command processor notifies the page monitor of the start of the process of the new page. However, since the page number designation doesn't exist in the control information unit, the page number is not notified. When receiving such a notification, the page monitor progresses the page counter 70 by only 1 and sets the new count value to the page number. That is, the page numbers of 1, 2, 3, 4, . . . are automatically added. The operation is substantially the same as that described in FIG. 5 except a point that the page numbers are as shown above. In this instance, on the host computer side as well, since each page is counted by the same rule as that of the printer, namely, in accordance with the order of 1, 2, 3, 4, . . . , the host computer and the printer identify the page by the same page number.

Figure 25:
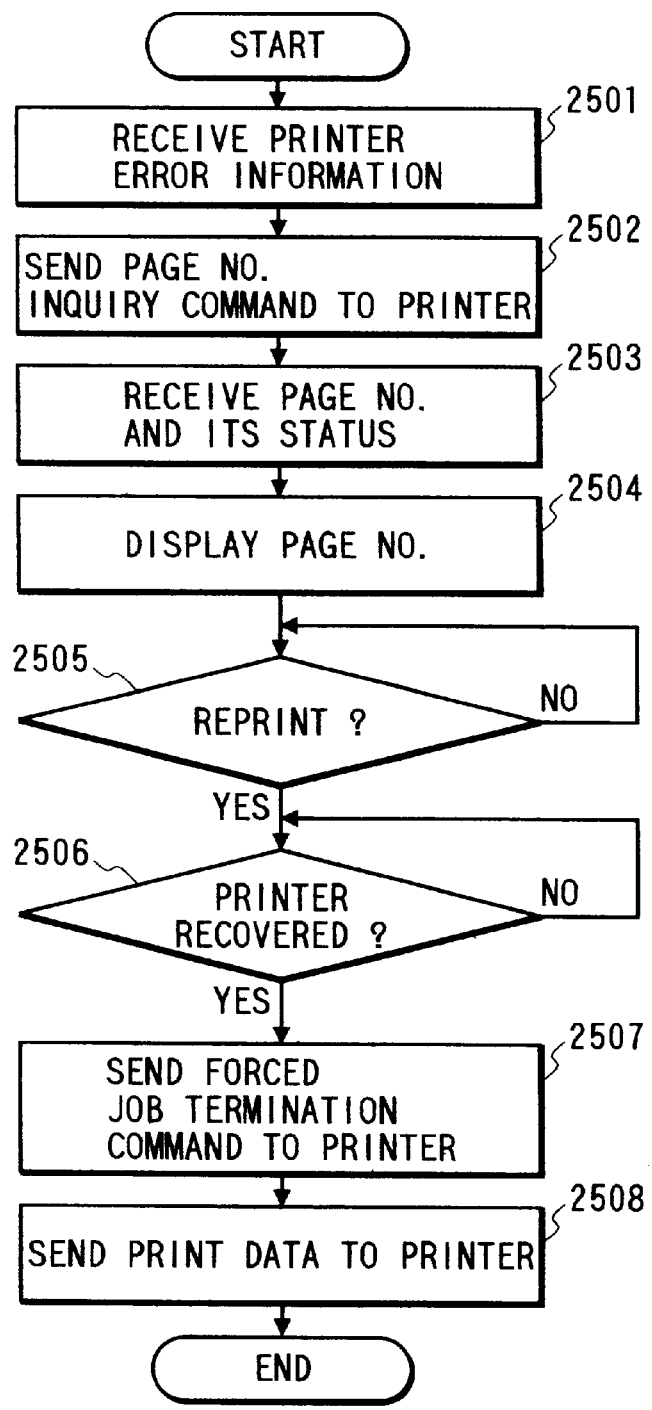
FIG. 25 is a flowchart for explaining the operation of a host computer.

A jam recovery process on the host computer side in the embodiment will now be described with reference to FIG. 25. A program regarding the flowchart of FIG. 25 is stored into the ROM in the host computer and is processed by the CPU in the host computer.

First, when a notification of paper jamming error information is received from the printer in step 2501, step 2502 follows. COM is set to 1 and a page inquiry command is transmitted to the printer. After that, the page number under printing and its processing status are received from the printer in step 2503. In step 2504, the page number is displayed on a CRT of the host computer on the basis of the received information. On the basis of an instruction to reprint (step 2505) by the operator, a check is made to see if the printer side has entered a status in which it can normally print (step 2506). In step 2507, COM is cleared to 1 and a print job forced termination command is transmitted to the printer. The printer side clears the input buffer, command processor, and print mechanism. In step 2508, on the basis of the page number and its processing status which were received in step 2503, the print data comprising a character code, a command, image data, and the like of the corresponding page is transferred.

In steps 2501 and 2502, although the page inquiry command has been transmitted on the basis of the notification of the error information, it is also possible to transmit it at an arbitrary timing and the host can also always display the page under printing.

According to the invention, the printer monitors the operating status of the page under printing or processing and can identify the page by the number which is common to the host computer and can return the processing situation for the page in response to the inquiry from the host computer.

By using such information, the host computer can know which page the printer is printing and can notify the operator of the print page.

When the printer halts due to an error, by reading such information, which page failed in the printing can be known and the data can be again automatically printed from the failed page.

What is claimed is:

1. A printer comprising:
   discriminating means for discriminating whether an urgent command or at least one printer command is received; and
   execution means for executing the urgent command and the printer command, wherein when said discriminating means discriminates that a printer command is received, said execution means stores the received printer command in an input buffer memory and executes the stored printer command in a sequential order of reception, and when said discriminating means discriminates that an urgent command is received, said execution means immediately executes the received urgent command.

2. A printer according to claim 1, further comprising print means for printing data in response to the received printer command.

3. A printer according to claim 1, the urgent command comprising a status inquiring command provided by an external apparatus for requesting a status of said printer, wherein said execution means returns the status of said printer to the external apparatus in response to the status inquiring command.

4. A printer according to claim 3, the status of said printer including at least one of an abnormal high temperature of a print head, a carriage movement fault, a paper feed fault, an absence of paper, printer jamming, a presence of an ink cartridge, an absence of an ink cartridge, and an amount of residual ink.

5. A printer according to claim 1, the urgent command comprising a command for one of suspending and resuming a printing operation, wherein said execution means immediately responds to the urgent command by one of suspending the printing operation in response to the suspending command, and resuming the printing operation in response to the resuming command.

6. A printer according to claim 1, the urgent command comprising a stopping command for stopping a printing job, wherein said execution means immediately ejects a sheet and cancels a current job in response to the stopping command.

7. A printer according to claim 1, the urgent command comprising a command for one of validating and invalidating a panel operation, wherein said execution means responds to the urgent command by one of validating the panel operation in response to the validating command, and invalidating the panel operation in response to the invalidating command.

8. A printer according to claim 1, the urgent command comprising a page number inquiring command provided by an external apparatus for requesting a number of a page being printed, wherein said execution means returns the page number to the external apparatus in response to the page number inquiring command.

9. A printer according to claim 1, wherein said discriminating means performs a discrimination in response to a status of a predetermined signal line provided in input means for inputting the urgent command or the at least one printer command.

10. A printing method comprising the steps of:
    discriminating whether an urgent command or at least one printer command is received; and
    executing the urgent command and the printer command, wherein
    when the printer command is received in said discriminating step,
    storing the printer command in an input buffer memory and executing the stored printer command in a sequential order of reception, and
    when an urgent command is received in said discriminating step
    executing the urgent command immediately.

11. A printing method according to claim 10, further comprising printing data in response to the printer command received in said discriminating step.

12. A printing method according to claim 10, wherein the urgent command received in said discriminating step includes a status inquiring command provided by an external apparatus for requesting a status of a printer, wherein, during said executing step, the status of the printer is returned to the external apparatus in response to the status inquiring command.

13. A printing method according to claim 12, wherein the status of the printer returned to the external apparatus during said executing step includes at least one of an abnormal high temperature of a print head, a carriage movement fault, a paper feed fault, an absence of paper, printer jamming, a presence of an ink cartridge, an absence of an ink cartridge, and an amount of residual ink.

14. A printing method according to claim 10, wherein the urgent command received in said discriminating step includes a command for one of suspending and resuming a printing operation, and said executing step includes immediately responding to the urgent command by one of suspending the printing operation in response to the suspending command, and resuming the printing operation in response to the resuming command.

15. A printing method according to claim 10, wherein the urgent command received in said discriminating step includes a stopping command for stopping a printing job, and said executing step includes immediately ejecting a sheet and cancelling a current job in response to the stopping command.

16. A printing method according to claim 10, wherein the urgent command received in said discriminating step includes a command for one of validating and invalidating a panel operation, and said executing step responds to the urgent command by one of validating the panel operation in response to the validating command, and invalidating the panel operation in response to the invalidating command.

17. A printing method according to claim 10, wherein the urgent command received in said discriminating step including a page number inquiring command provided by an external apparatus for requesting a number of a page being printed, wherein said executing step returns the page number to the external apparatus in response to the page number inquiring command.

18. A computer useable memory medium storing a computer executable program for performing the steps of:
    discriminating at least one printer command and an urgent command; and
    executing the urgent command and the printer command, wherein when the printer command is received in said discriminating step, storing the printer command in an input buffer memory and executing the stored printer command in a sequential order of reception, and when the urgent command is received in the discriminating step, executing the urgent command immediately.

19. A memory medium according to claim 18, further comprising printing data in response to the printer command received in said discriminating step.

20. A memory medium according to claim 18, wherein the urgent command received in said discriminating step includes a status inquiring command from an external apparatus for requesting a status of a printer, wherein, during said executing step, the status of the printer is returned to the external apparatus in response to the status inquiring command.

21. A memory medium according to claim 20, the status of the printer returned to the external apparatus during said executing step includes at least one of an abnormal high temperature of a print head, a carriage movement fault, a paper feed fault, an absence of paper, printer jamming, a presence of an ink cartridge, an absence of an ink cartridge, and an amount of residual ink.

22. A memory medium according to claim 18, wherein the urgent command received in said discriminating step includes a command for one of suspending and resuming a printing operation, and said executing step includes immediately responding to the urgent command by one of suspending the printing operation in response to the suspending command, and resuming the printing operation in response to the resuming command.

23. A memory medium according to claim 18, wherein the urgent command received in said discriminating step includes a stopping command for stopping a printing operation, and said executing step includes immediately ejecting a sheet and cancelling a current job in response to the stopping command.

24. A memory medium according to claim 18, wherein the urgent command received in said discriminating step includes a command for one of validating and invalidating a panel operation, and said executing step responds to the urgent command by one of validating the panel operation in response to the validating command, and invalidating the panel operation in response to the invalidating command.

25. A memory medium according to claim 18, wherein the urgent command received in said discriminating step includes a page number inquiring command provided by an external apparatus for requesting a number of a page being printed, wherein said executing step returns the page number to the external apparatus in response to the page number inquiring command.

* * * * *

UNITED STATES PATENT AND TRADEMARK OFFICE
CERTIFICATE OF CORRECTION

PATENT NO. : 6,055,361
DATED : April 25, 2000
INVENTOR(S) : Takayuki Fujita, et al.

It is certified that error appears in the above-identified patent and that said Letters Patent is hereby corrected as shown below:

Drawings,
Sheet 2,
Figure 2 should be labeled as -- PRIOR ART --.

Column 1,
Line 22, "generate" should read -- generates --;
Line 59, "page" should read -- pages --; and
Line 65, "enables" should read -- enable --.

Column 3,
Line 34, "made" should read -- made to --; and
Line 60, "made" should read -- made to --.

Column 4,
Line 12, "of of a" should read -- of a --.

Column 6,
Line 26, "supplies" should read -- supplies it --.

Column 7,
Line 49, "is" should be deleted.

Column 8,
Line 57, "those" should read -- that --.

Column 9,
Line 59, "interested" should read -- involved --.

Column 12,
Line 39, "until" should read -- at -- , and "finished" should read -- finished if it --.

UNITED STATES PATENT AND TRADEMARK OFFICE
CERTIFICATE OF CORRECTION

PATENT NO. : 6,055,361
DATED : April 25, 2000
INVENTOR(S) : Takayuki Fujita, et al.

It is certified that error appears in the above-identified patent and that said Letters Patent is hereby corrected as shown below:

Column 14,
Line 20, "a point" should be deleted.

Signed and Sealed this

Thirteenth day of November, 2001

Attest:

*Nicholas P. Godici*

NICHOLAS P. GODICI
*Acting Director of the United States Patent and Trademark Office*

*Attesting Officer*